US008510599B2

(12) United States Patent
Coneski et al.

(10) Patent No.: US 8,510,599 B2
(45) Date of Patent: Aug. 13, 2013

(54) MANAGING PROCESSING ASSOCIATED WITH HARDWARE EVENTS

(75) Inventors: Anthony F. Coneski, Newburgh, NY (US); David Craddock, New Paltz, NY (US); Charles W. Gainey, Jr., Poughkeepsie, NY (US); Beth A. Glendening, Poughkeepsie, NY (US); Thomas A. Gregg, Highland, NY (US); Ugochukwu C. Njoku, Yonkers, NY (US); Peter K. Szwed, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 12/821,191

(22) Filed: Jun. 23, 2010

(65) Prior Publication Data

US 2011/0320860 A1 Dec. 29, 2011

(51) Int. Cl.
*G06F 11/00* (2006.01)
(52) U.S. Cl.
USPC .............................................. 714/25; 714/5.1
(58) Field of Classification Search
USPC ............................................................. 714/25
See application file for complete search history.

(56) References Cited

U.S. PATENT DOCUMENTS

| | | | |
|---|---|---|---|
| 4,323,963 A | 4/1982 | Wu | |
| 5,053,952 A | 10/1991 | Koopman, Jr. et al. | |
| 5,170,472 A | 12/1992 | Cwiakala et al. | |
| 5,265,240 A | 11/1993 | Galbraith et al. | |
| 5,282,274 A | 1/1994 | Liu | |
| 5,430,856 A | 7/1995 | Kinoshita | |
| 5,465,332 A | 11/1995 | Deloye et al. | |
| 5,465,355 A | 11/1995 | Cook et al. | |
| 5,535,352 A | 7/1996 | Bridges et al. | |
| 5,551,013 A | 8/1996 | Beausoleil et al. | |
| 5,574,873 A | 11/1996 | Davidian | |
| 5,600,805 A | 2/1997 | Fredericks et al. | |
| 5,617,554 A | 4/1997 | Alpert et al. | |
| 5,742,785 A | 4/1998 | Stone et al. | |
| 5,761,448 A | 6/1998 | Adamson et al. | |
| 5,790,825 A | 8/1998 | Traut | |
| 5,802,590 A | 9/1998 | Draves | |
| 5,819,053 A | 10/1998 | Goodrum et al. | |
| 5,822,616 A | 10/1998 | Hirooka | |

(Continued)

FOREIGN PATENT DOCUMENTS

| | | |
|---|---|---|
| EP | 0076921 A2 | 4/1983 |
| EP | 0552873 A1 | 7/1993 |

(Continued)

OTHER PUBLICATIONS

International Search Report and Written Opinion for PCT/EP2010/067039 dated Feb. 25, 2011.

(Continued)

*Primary Examiner* — Kamini Patel
(74) *Attorney, Agent, or Firm* — John E. Campbell; Blanche E. Schiller, Esq.; Heslin Rothenberg Farley & Mesiti P.C.

(57) ABSTRACT

Detection, notification and/or processing of events, such as errors associated with adapters, are facilitated. Hardware detects an event, places one or more adapters in an error state to prevent access to/from the adapters, and notifies the operating system of the event.

22 Claims, 20 Drawing Sheets

(56) References Cited

U.S. PATENT DOCUMENTS

| | | |
|---|---|---|
| 5,826,084 A | 10/1998 | Brooks et al. |
| 5,838,960 A | 11/1998 | Harriman, Jr. |
| 5,870,598 A | 2/1999 | White et al. |
| 5,901,312 A | 5/1999 | Radko |
| 5,960,213 A | 9/1999 | Wilson |
| 5,974,440 A | 10/1999 | Brooks et al. |
| 6,009,261 A | 12/1999 | Scalzi et al. |
| 6,023,736 A | 2/2000 | Lambeth et al. |
| 6,067,595 A | 5/2000 | Lindenstruth |
| 6,078,970 A | 6/2000 | Nordstrom et al. |
| 6,205,530 B1 | 3/2001 | Kang |
| 6,308,255 B1 | 10/2001 | Gorishek, IV et al. |
| 6,330,647 B1 | 12/2001 | Jeddeloh et al. |
| 6,330,656 B1 | 12/2001 | Bealkowski et al. |
| 6,349,380 B1 | 2/2002 | Shahidzadeh et al. |
| 6,408,347 B1 | 6/2002 | Smith et al. |
| 6,463,582 B1 | 10/2002 | Lethin et al. |
| 6,493,741 B1 | 12/2002 | Emer et al. |
| 6,519,645 B2 | 2/2003 | Markos et al. |
| 6,529,978 B1 | 3/2003 | Eide et al. |
| 6,578,191 B1 | 6/2003 | Boehme et al. |
| 6,615,305 B1 | 9/2003 | Olesen et al. |
| 6,654,818 B1 | 11/2003 | Thurber |
| 6,658,521 B1 | 12/2003 | Biran et al. |
| 6,658,599 B1* | 12/2003 | Linam et al. .................. 714/25 |
| 6,704,831 B1 | 3/2004 | Avery |
| 6,715,011 B1 | 3/2004 | Buckland et al. |
| 6,721,839 B1 | 4/2004 | Bauman et al. |
| 6,751,752 B1* | 6/2004 | Smith ............................ 714/39 |
| 6,772,097 B1 | 8/2004 | Kromenaker et al. |
| 6,772,264 B1 | 8/2004 | Dayan et al. |
| 6,792,492 B1 | 9/2004 | Griffin |
| 6,820,164 B2 | 11/2004 | Holm et al. |
| 6,901,537 B2 | 5/2005 | Dawkins et al. |
| 6,907,510 B2 | 6/2005 | Bennett et al. |
| 6,963,940 B1 | 11/2005 | Glassen et al. |
| 6,970,992 B2 | 11/2005 | Gurumoorthy et al. |
| 6,978,338 B2 | 12/2005 | Wang et al. |
| 6,996,638 B2 | 2/2006 | Brice, Jr. et al. |
| 7,065,598 B2 | 6/2006 | Connor et al. |
| 7,107,384 B1 | 9/2006 | Chen et al. |
| 7,127,599 B2 | 10/2006 | Brice, Jr. et al. |
| 7,130,938 B2 | 10/2006 | Brice, Jr. et al. |
| 7,139,940 B2 | 11/2006 | Arbeitman et al. |
| 7,174,550 B2 | 2/2007 | Brice, Jr. et al. |
| 7,177,961 B2 | 2/2007 | Brice, Jr. et al. |
| 7,200,704 B2 | 4/2007 | Njoku et al. |
| 7,209,994 B1 | 4/2007 | Klaiber et al. |
| 7,260,664 B2 | 8/2007 | Arndt et al. |
| 7,277,968 B2 | 10/2007 | Brice, Jr. et al. |
| 7,296,120 B2 | 11/2007 | Corrigan et al. |
| 7,302,692 B2 | 11/2007 | Bae et al. |
| 7,334,107 B2 | 2/2008 | Schoinas et al. |
| 7,340,582 B2 | 3/2008 | Madukkarumukumana |
| 7,380,041 B2 | 5/2008 | Belmar et al. |
| 7,398,343 B1 | 7/2008 | Marmash et al. |
| 7,412,488 B2 | 8/2008 | Jha et al. |
| 7,418,572 B2 | 8/2008 | Hepkin |
| 7,420,931 B2 | 9/2008 | Nanda et al. |
| 7,444,493 B2 | 10/2008 | Schoinas et al. |
| 7,454,548 B2 | 11/2008 | Belmar et al. |
| 7,475,183 B2 | 1/2009 | Traut et al. |
| 7,493,425 B2 | 2/2009 | Arndt et al. |
| 7,496,707 B2 | 2/2009 | Freking et al. |
| 7,506,087 B2 | 3/2009 | Ho et al. |
| 7,509,391 B1 | 3/2009 | Chauvel et al. |
| 7,529,860 B2 | 5/2009 | Freimuth et al. |
| 7,530,071 B2 | 5/2009 | Billau et al. |
| 7,546,406 B2 | 6/2009 | Armstrong et al. |
| 7,546,487 B2 | 6/2009 | Marisetty et al. |
| 7,549,090 B2 | 6/2009 | Bailey et al. |
| 7,552,298 B2 | 6/2009 | Bestler |
| 7,562,366 B2 | 7/2009 | Pope et al. |
| 7,567,567 B2 | 7/2009 | Muller et al. |
| 7,587,531 B2 | 9/2009 | Brice, Jr. et al. |
| 7,600,053 B2 | 10/2009 | Carlson et al. |
| 7,606,965 B2 | 10/2009 | Njoku et al. |
| 7,613,847 B2 | 11/2009 | Kjos et al. |
| 7,617,340 B2 | 11/2009 | Gregg |
| 7,617,345 B2 | 11/2009 | Clark et al. |
| 7,623,460 B2 | 11/2009 | Miyazaki |
| 7,624,235 B2 | 11/2009 | Wadhawan et al. |
| 7,627,723 B1 | 12/2009 | Buck et al. |
| 7,631,097 B2 | 12/2009 | Moch et al. |
| 2001/0021971 A1 | 9/2001 | Gibson et al. |
| 2003/0056155 A1 | 3/2003 | Austen et al. |
| 2003/0074541 A1 | 4/2003 | Plambeck |
| 2004/0025166 A1 | 2/2004 | Adlung et al. |
| 2004/0064618 A1 | 4/2004 | Farrell et al. |
| 2004/0073905 A1 | 4/2004 | Emer et al. |
| 2004/0117534 A1 | 6/2004 | Parry et al. |
| 2004/0139304 A1 | 7/2004 | Arimilli et al. |
| 2004/0199700 A1 | 10/2004 | Clayton |
| 2004/0236880 A1* | 11/2004 | Barrett ............................ 710/52 |
| 2005/0033895 A1 | 2/2005 | Lueck et al. |
| 2005/0071472 A1 | 3/2005 | Arndt et al. |
| 2005/0114586 A1* | 5/2005 | Brice et al. ..................... 711/1 |
| 2005/0114623 A1 | 5/2005 | Craddock et al. |
| 2005/0257100 A1* | 11/2005 | Anglin et al. .................... 714/48 |
| 2005/0289271 A1 | 12/2005 | Martinez et al. |
| 2006/0005083 A1 | 1/2006 | Genden et al. |
| 2006/0101181 A1 | 5/2006 | Post et al. |
| 2006/0130071 A1* | 6/2006 | Martin et al. ................. 719/319 |
| 2006/0195617 A1 | 8/2006 | Arndt et al. |
| 2006/0195644 A1 | 8/2006 | Arndt et al. |
| 2006/0230208 A1 | 10/2006 | Gregg et al. |
| 2006/0253619 A1 | 11/2006 | Torudbakken et al. |
| 2006/0288130 A1 | 12/2006 | Madukkarumukumana |
| 2007/0028087 A1 | 2/2007 | Yu et al. |
| 2007/0073955 A1 | 3/2007 | Murray et al. |
| 2007/0097871 A1* | 5/2007 | Boyd et al. ..................... 370/242 |
| 2007/0136554 A1 | 6/2007 | Biran et al. |
| 2007/0168636 A1 | 7/2007 | Hummel et al. |
| 2007/0168643 A1 | 7/2007 | Hummel et al. |
| 2007/0168644 A1 | 7/2007 | Hummel et al. |
| 2007/0168934 A1 | 7/2007 | Chandrasekharan et al. |
| 2007/0174723 A1* | 7/2007 | Cardona et al. ................. 714/43 |
| 2007/0186074 A1 | 8/2007 | Bradford et al. |
| 2007/0226386 A1 | 9/2007 | Sharp et al. |
| 2007/0234018 A1 | 10/2007 | Feiste |
| 2007/0245041 A1 | 10/2007 | Hua et al. |
| 2007/0260768 A1 | 11/2007 | Bender et al. |
| 2007/0271559 A1 | 11/2007 | Easton et al. |
| 2008/0091851 A1 | 4/2008 | Sierra |
| 2008/0091868 A1 | 4/2008 | Mizrachi et al. |
| 2008/0091915 A1 | 4/2008 | Moertl et al. |
| 2008/0114734 A1 | 5/2008 | Suwabe |
| 2008/0114906 A1 | 5/2008 | Hummel et al. |
| 2008/0126648 A1 | 5/2008 | Brownlow et al. |
| 2008/0126652 A1 | 5/2008 | Vembu et al. |
| 2008/0148295 A1 | 6/2008 | Freimuth et al. |
| 2008/0168208 A1 | 7/2008 | Gregg |
| 2008/0222406 A1 | 9/2008 | Tabuchi |
| 2008/0235425 A1 | 9/2008 | Belmar et al. |
| 2008/0263391 A1* | 10/2008 | Blinick et al. ..................... 714/5 |
| 2008/0270853 A1* | 10/2008 | Chagoly et al. ................. 714/49 |
| 2009/0024823 A1 | 1/2009 | Ko et al. |
| 2009/0049220 A1 | 2/2009 | Conti et al. |
| 2009/0070760 A1 | 3/2009 | Khatri et al. |
| 2009/0089780 A1 | 4/2009 | Johnson et al. |
| 2009/0125666 A1 | 5/2009 | Freking et al. |
| 2009/0144462 A1 | 6/2009 | Arndt et al. |
| 2009/0172211 A1 | 7/2009 | Perry et al. |
| 2009/0182966 A1 | 7/2009 | Greiner et al. |
| 2009/0182969 A1 | 7/2009 | Norgaard et al. |
| 2009/0210646 A1 | 8/2009 | Bauman et al. |
| 2009/0222814 A1 | 9/2009 | Astrand |
| 2009/0240849 A1 | 9/2009 | Corneli et al. |
| 2009/0249039 A1 | 10/2009 | Hook et al. |
| 2009/0276774 A1 | 11/2009 | Kinoshita |
| 2009/0328035 A1 | 12/2009 | Ganguly |
| 2010/0005234 A1 | 1/2010 | Ganga et al. |
| 2011/0099289 A1* | 4/2011 | Poggesi et al. ................. 709/234 |
| 2011/0138219 A1 | 6/2011 | Walton et al. |

| | | | | |
|---|---|---|---|---|
| 2011/0320638 | A1* | 12/2011 | Coneski et al. | 710/5 |
| 2011/0320643 | A1* | 12/2011 | Brice et al. | 710/20 |
| 2011/0320644 | A1* | 12/2011 | Craddock et al. | 710/22 |
| 2011/0320652 | A1* | 12/2011 | Craddock et al. | 710/64 |
| 2011/0320662 | A1* | 12/2011 | Craddock et al. | 710/263 |
| 2011/0320663 | A1* | 12/2011 | Brice et al. | 710/269 |
| 2011/0320664 | A1* | 12/2011 | Belmar et al. | 710/269 |
| 2011/0320756 | A1* | 12/2011 | Craddock et al. | 711/202 |
| 2011/0320758 | A1* | 12/2011 | Craddock et al. | 711/206 |
| 2011/0320759 | A1* | 12/2011 | Craddock et al. | 711/206 |
| 2011/0320764 | A1* | 12/2011 | Craddock et al. | 711/221 |
| 2011/0320772 | A1* | 12/2011 | Craddock et al. | 712/205 |
| 2011/0321060 | A1* | 12/2011 | Craddock et al. | 719/313 |
| 2011/0321061 | A1* | 12/2011 | Craddock et al. | 719/318 |
| 2011/0321158 | A1* | 12/2011 | Craddock et al. | 726/20 |
| 2012/0239973 | A1 | 9/2012 | Walton et al. | |

FOREIGN PATENT DOCUMENTS

| | | |
|---|---|---|
| EP | 0902355 A2 | 3/1999 |
| EP | 0955585 A2 | 10/1999 |
| EP | 1096376 A2 | 2/2001 |
| EP | 1489491 A1 | 12/2004 |
| JP | 57191826 A | 11/1982 |
| JP | 359081724 A | 5/1984 |
| JP | 362079557 A | 4/1987 |
| JP | 405053973 A | 3/1993 |
| JP | 510996 A | 4/1993 |
| WO | WO9600940 A1 | 6/1995 |
| WO | WO9938074 A1 | 7/1999 |
| WO | WO 02/41157 A2 | 5/2002 |

OTHER PUBLICATIONS

International Search Report and Written Opinion for PCT/EP2010/067036 dated Feb. 14, 2011.
International Search Report and Written Opinion for PCT/EP2010/067020 dated Apr. 5, 2011.
International Search Report and Written Opinion for PCT/EP2010/067025 dated Apr. 13, 2011.
International Search Report and Written Opinion for PCT/EP2010/067024 dated Apr. 27, 2011.
International Search Report and Written Opinion for PCT/EP2010/067019 dated Apr. 26, 2011.
International Search Report and Written Opinion for PCT/EP2010/067021 dated Apr. 28, 2011.
International Search Report and Written Opinion for PCT/EP2010/067043 dated Apr. 21, 2011.
International Search Report and Written Opinion for PCT/EP2010/067041 dated Apr. 26, 2011.
International Search Report and Written Opinion for PCT/EP2010/067031 dated Apr. 26, 2011.
International Search Report and Written Opinion for PCT/EP2010/067034 dated May 18, 2011.
International Search Report and Written Opinion for PCT/EP2010/067023 dated Jun. 15, 2011.
International Search Report and Written Opinion for PCT/EP2010/067032 dated May 27, 2011.
International Search Report and Written Opinion for PCT/EP2010/067038 dated Jun. 15, 2011.
"Chapter 6: Configuration Space" in PCI-SIG: "PCI Local Bus Specification Revision 3.0", Feb. 2004, pp. 213-254.
Hennet, P. et al., "Programmable Interrupt Vectors in Processors," IBM Technical Disclosure Bulletin, vol. 25, No. 5, Oct. 1, 1982, pp. 2641-2642.
Plambeck et al., "Development and Attributes of z/Architecture," IBM Journal of Research and Development, IBM Corporation, vol. 46, No. 4/05, Jul. 1, 2002, pp. 367-379.
"z/Architecture Principles of Operation, Chapter 3", Feb. 2008, pp. 1-71.
Gehringer, E. F., et al., "Virtual Memory Systems," CSC-506—Architecture of Parallel Computers Computer Science Department, College of Engineering, North Carolina, Dec. 31, 1999, XP002631523.

"z/Architecture—Principles of Operation," IBM Publication No. SA22-7832-05, Sixth Edition, Apr. 2007, Chapter 10, 10-1-10-138.
"PCI Local Bus Specification," Mar. 29, 2002, pp. 1-328.
"Decreased Latency Across PCI Express With I/O Virtualization Via a Hint Interface," IPCOM000185226D, Jul. 16, 2009, pp. 1-2.
Office Action for U.S. Appl. No. 12/821,182 dated Oct. 13, 2011.
McGee, H.T., "Technique for Resetting a Single Channel Path Under Operator Control in IBM System/370XA," IBM Technical Disclosure Bulletin, vol. 26, No. 10B, Mar. 1984.
McGee, H.T., "Technique for Resetting a Single Channel Path Under Operator Control in IBM System/370XA," IBM Technical Disclosure Bulletin, vol. 26, No. 10B, Mar. 1, 1984.
International Search Report and Written Opinion for PCT/EP2010/067030 dated Feb. 7, 2011.
U.S. Appl. No. 12/708,284, "Load Pair Disjoint Facility and Instruction Therefore," filed Jun. 24, 2010.
U.S. Appl. No. 12/820,735, "High-Word Facility for Extending the Number of General Purpose Registers Available to Instructions," filed Jun. 22, 2010.
U.S. Appl. No. 12/820,768, "Instructions for Performing an Operation on Two Operands and Subsequently Storing an Original Value of Operand," filed Jun. 22, 2010.
U.S. Appl. No. 12/821,224, "Associating Input/Output Device Requests With Memory Associated With a Logical Partition," filed Jun. 21, 2010.
U.S. Appl. No. 12/821,239, "Input/Output (I/O) Expansion Response Processing in a Peripheral Component Interconnect Express (PCIE) Environment," filed Jun. 23, 2010.
U.S. Appl. No. 12/821,242, "A System and Method for Downbound I/O Expansion Request and Response Processing in a PCIe Architecture," filed Jun. 23, 2010.
U.S. Appl. No. 12/821,243, "Upbound Input/Output Expansion Request and Response Processing in a PCIE Architecture," filed Jun. 23, 2010.
U.S. Appl. No. 12/821,245, "A System and Method for Routing I/O Expansion Requests and Responses in a PCIE Architecture," filed Jun. 23, 2010.
U.S. Appl. No. 12/821,247, "Scalable I/O Adapter Function Level Error Detection, Isolation, and Reporting," filed Jun. 23, 2010.
U.S. Appl. No. 12/821,248, "Connected Input/Output HUB Management," filed Jun. 23, 2010.
U.S. Appl. No. 12/821,256, "Switch Failover Control in a Multiprocessor Computer System," filed Jun. 23, 2010.
U.S. Appl. No. 12/821,271, "Memory Error Isolation and Recovery in a Multiprocessor Computer System," filed Jun. 23, 2010.
U.S. Appl. No. 12/822,358, "Function Virtualization Facility for Function Query of a Processor," filed Jun. 24, 2010.
U.S. Appl. No. 12/822,368, "Function Virtualization Facility for Blocking Instruction Function of a Multi-Function Instruction of a Virtual Processor," filed Jun. 24, 2010.
Craddock et al., U.S. Appl. No. 12/821,170, "Translation of Input/Output Address to Memory Addresses" filed Jun. 23, 2010.
Craddock et al., U.S. Appl. No. 12/821,171, "Runtime Determination of Translation Formats for Adapter Functions," filed Jun. 23, 2010.
Craddock et al., U.S. Appl. No. 12/821,172, "Resizing Address Spaces Concurrent to Accessing the Address Spaces," filed Jun. 23, 2010.
Craddock et al., U.S. Appl. No. 12/821,174, "Multiple Address Spaces Per Adapter," filed Jun. 23, 2010.
Craddock et al., U.S. Appl. No. 12/821,175, "Converting a Message Signaled Interruption Into an I/O Adapter Event Notification," filed Jun. 23, 2010.
Brice et al., U.S. Appl. No. 12/821,177, "Converting a Message Signaled Interruption Into an I/O Adapter Event Notification to a Guest Operating System," filed Jun. 23, 2010.
Craddock et al., U.S. Appl. No. 12/821,178, "Identification of Types of Sources of Adapter Interruptions," filed Jun. 23, 2010.
Belmar et al., U.S. Appl. No. 12/821,179, "Controlling a Rate At Which Adapter Interruption Requests Are Processed," filed Jun. 23, 2010.
Craddock et al., U.S. Appl. No. 12/821,181, "Controlling the Selectively Setting of Operational Parameters for an Adapter," filed Jun. 23, 2010.
Craddock et al., U.S. Appl. No. 12/821,182, "Load Instruction for Communicating With Adapters," filed Jun. 23, 2010.

Craddock et al., U.S. Appl. No. 12/821,184, "Controlling Access by a Configuration to an Adapter Function," filed Jun. 23, 2010.
Coneski et al., U.S. Appl. No. 12/821,185, "Discovery by Operating System of Information Relating to Adapter Functions Accessible to the Operating System," filed Jun. 23, 2010.
Coneski et al., U.S. Appl. No. 12/821,187, "Enable/Disable Adapters of a Computing Environment," filed Jun. 23, 2010.
Craddock et al., U.S. Appl. No. 12/821,190, "Guest Access to Address Spaces of Adapter," filed Jun. 23, 2010.
Craddock et al., U.S. Appl. No. 12/821,192, "Operating System Notification of Actions to Be Taken Responsive to Adapter Events," filed Jun. 23, 2010.
Brice et al., U.S. Appl. No. 12/821,193, "Measurement Facility for Adapter Functions," filed Jun. 23, 2010.
Craddock et al., U.S. Appl. No. 12/821,194, "Store/Store Block Instructions for Communicating With Adapters," filed Jun. 23, 2010.
Paulsen, Eric; "Local Memory Coaxes Top Speed from SCSI Masters," Electronic Design, v. 41, Apr. 15, 1993, pp. 76-6+.
Ganapathy, Narayanan; "General Purpose Operating System Support for Multiple Page Sizes," USENIX Annual Technical Conference (No. 98), 1998, pp. 91-104.
Talluri et al., "A New Page Table for 64-bit Address Spaces," ACM SIGOPS Operating Systems Review, vol. 29, Issue 5 (Dec. 1995), pp. 194-200.
"Large Page Support in the Linux Kernel," http://lwn.net/Articles/6969/ <retrieved on Jan. 26, 2010>.
Crawford, Catherine H. et al., "Accelerating Computing with the Cell Broadband Engine Processor," May 2008, CF '08, May 5-7, 2008, Ischia, Italy, pp. 3-11.
Baumann, Andrew, et al., "The Multikernel: A New OS Architecture for Scalable Multicore Systems," Oct. 2009, SOSP '09, Oct. 11-14, 2009, Big Sky, Montana, USA, pp. 29-43.
Swift, Michael M. et al., "Improving the Reliability of Commodity Operating Systems," ACM Transactions on Computer Systems, vol. 23, No. 1, Feb. 2005, pp. 77-110.
Xu, Min et al., "Towards a VMM-based Usage Control Framework for OS Kernel Integrity Protection," SACMAT '07, Jun. 20-22, 2007, Sophia Antipolis, France, pp. 71-80.
Huang, Wei et al., "A Case for High Performance Computing with Virtual Machines," ISC '06, Jun3 28 30, Carins, Queensland, Australia, pp. 125-134, Jun. 3, 2006.
Mysore, Shashidhar et al., "Understanding and Visualizing Full Systems with Data Flow Tomography," SPOLOS '08, Mar. 1-5, 2008, Seattle, Washington, USA, pp. 211-221.
"DMA Engines Bring Multicast to PCI Express Systems," http://electronicdesign.com, Aug. 13, 2009, 3 pages.
"Xen Wiki," http://wiki.xensource.com/xenwiki/VTdHowTo, 5 pages, Apr. 16, 2010.
Vaidyanathan, K., et al., "Exploiting RDMA Operations for Providing Efficient Fine-Grained Resource Monitoring in Cluster-based Servers," 1-4244-0328—Jun. 2006, 10 pages.
"IBM Enhances the IBM eServer zSeries 990 Family of Servers," Hardware Announcement, Oct. 7, 2003, pp. 1-11.
"Intel® Virtualization Technology for Directed I/O," Intel® Technology Journal, vol. 10, Issue 3, Aug. 10, 2006.
"I/O Virtualization and AMD's IOMMU," AMD Developer Central, http://developer.amd.com/documentation/articles/pages/892006101.aspx, Aug. 9, 2006.
"z/Architecture Principles of Operation," IBM Publication No. SA22-7832-07, Feb. 2009.
"z/VM: Running Guest Operating Systems," IBM Publication No. SC24-5997-02, Oct. 2001.
"z/VM: General Information Manual," IBM Publication No. GC24-5991-05, May 2003.
Winwood, Simon, et al., "Multiple Page Size Support in the Linux Kernel", Proceedings of Ottawa Linux Symposium, 2002.
"z/Architecture Principles of Operation," Chapter 17, pp. 17-1-17-30, IBM Publication No. SA22-7832-07, Feb. 2009.
"Intel® Itanium® Architecture Software Developer's Manual," vol. 2, Rev. 2.2, Jan. 2006.
Office Action for U.S. Appl. No. 12/821,193 dated Feb. 24, 2012.
"PCI Local Bus Specification Revision 3.0," Aug. 12, 2002, pp. 39, 44, 48, 49 and 58.
International Search Report and Written Opinion for PCT/EP2010/067035 dated Mar. 8, 2011.
Office Action for U.S. Appl. No. 12/821,192 dated Oct. 11, 2012.
International Search Report and Written Opinion for PCT/EP2010/067029 dated Mar. 2, 2011.
"IBM System/390 I/O Call Reporting Process," IBM Technical Disclosure Bulletin, vol. 36, No. 1, Jan. 1993, pp. 164-169, XP000222812.
"Means for Channel Subsystem-Initiated Communication," IBM Technical Disclosure Bulletin, vol. 33, No. 12, May 1991, p. 169, XP000121623.
International Search Report and Written Opinion for PCT/EP2010/067028 dated Mar. 8, 2011.
International Search Report and Written Opinion for PCT/EP2010/067042 dated Apr. 28, 2011.
Communication Pursuant to Article 94(3) EPC for Application No. 10 776 350.0/2212 dated Oct. 31, 2012.
Communication Pursuant to Article 94(3) EPC for Application No. 10 784 272.6-1243 dated Feb. 6, 2013, pp. 1-7.
Office Action for U.S. Appl. No. 12/821,181 dated Mar. 26, 2013, pp. 1-37.
Communication Pursuant to Article 94(3) EPC for Application No. 10 776 345.0-1956, dated May 31, 2013, pp. 1-6.

* cited by examiner

MANAGING PROCESSING ASSOCIATED WITH HARDWARE EVENTS

BACKGROUND

This invention relates, in general, to managing processing associated with events of hardware components of a computing environment, and in particular, to facilitating notification and handling of adapter error events.

In computing environments that include external hardware, such as adapters, errors arising from the adapters are reported to the operating system. This error reporting is device-specific and ranges from primitive reporting to complex reporting. Until the error is reported and processed by the operating system, accesses to and/or from the adapter are possible. This may affect data integrity.

Responsive to receiving a report regarding an error, the operating system places the adapter in an error state and handles the error. This handling of the error is also device-specific.

BRIEF SUMMARY

In accordance with an aspect of the present invention, an adapter having an error associated therewith is placed in an error state prior to the operating system receiving notification of the error. Further, the notification is device-independent in that a common infrastructure is used to report the error.

The shortcomings of the prior art are overcome and advantages are provided through the provision of a computer program product for managing events of a computing environment. The computer program product includes a computer readable storage medium readable by a processing circuit and storing instructions for execution by the processing circuit for performing a method. The method includes, for instance, detecting an event associated with an adapter; responsive to detecting the event, blocking instructions from accessing the adapter; notifying an operating system of the event being detected; and responsive to executing a Store Event Information command, issued by the operating system, obtaining a function handle identifying the adapter and a PCI event code describing the event.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, detection, notification and/or processing of events, such as adapter error events, are facilitated. Hardware detects an event and notifies the operating system of the event, which takes action regarding the event. In one particular example, an I/O hub coupled to one or more adapters and a processing unit detects an error associated with an adapter, and reports the error to firmware of the processing unit. The I/O hub and/or firmware blocks access to/from the adapter associated with the error. Further, the firmware reports the error to the operating system executing on the processing unit, which may handle one or more aspects regarding the error. As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Further, as used herein, the term "adapter" includes any type of adapter (e.g., storage adapter, network adapter, processing adapter, cryptographic adapter, PCI adapter, other type of input/output adapter, etc.). In one embodiment, an adapter includes one adapter function. However, in other embodiments, an adapter may include a plurality of adapter functions. One or more aspects of the present invention are applicable whether an adapter includes one adapter function or a plurality of adapter functions. Further, in the examples presented herein, adapter is used interchangeably with adapter function (e.g., PCI function) unless otherwise noted.

In one embodiment, the reporting to the operating system is standardized, even for adapter-specific errors. Standardization of adapter-specific error reporting to the operating system results in simplification of adapter error processing across adapter types.

Figure 1:
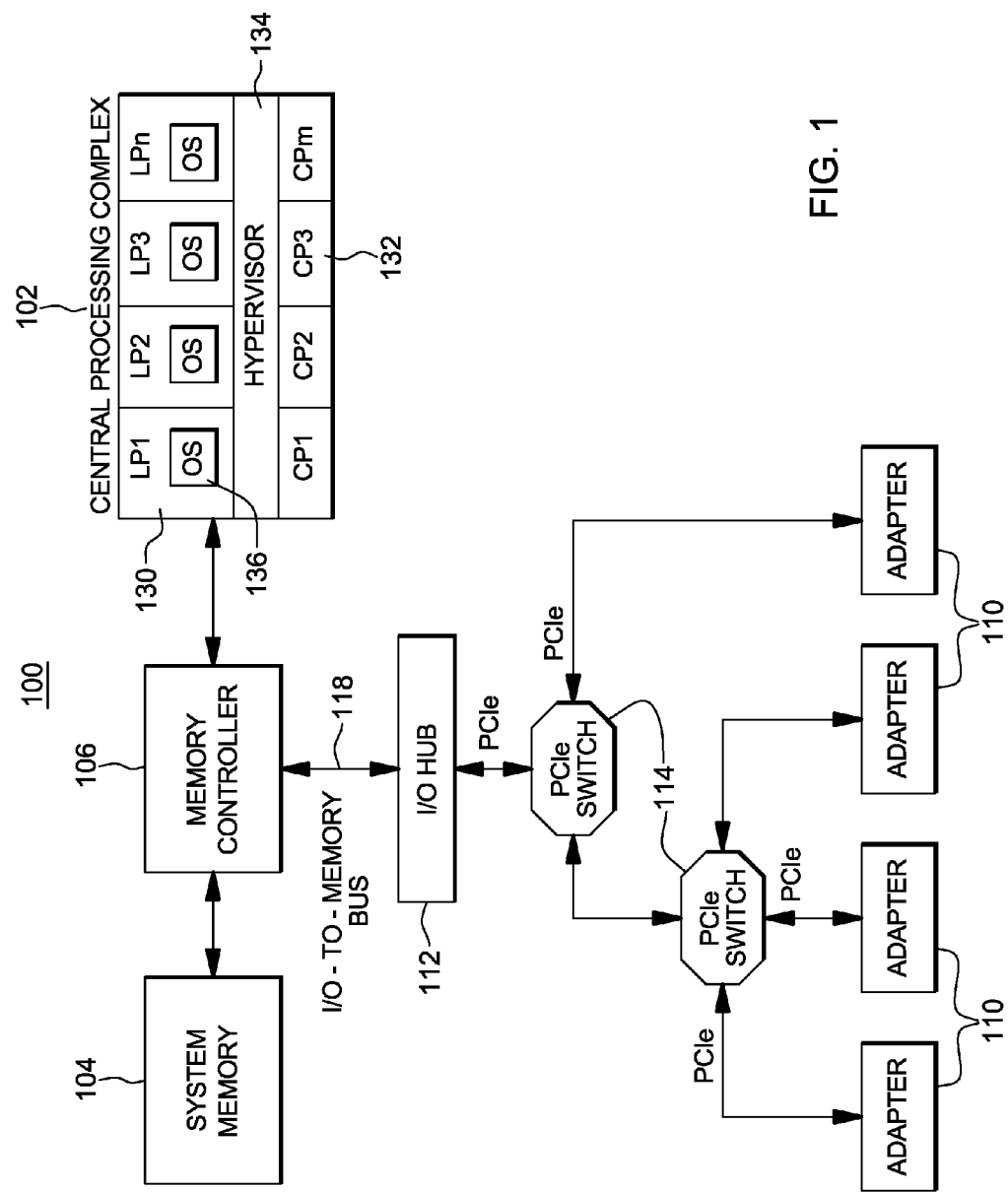
FIG. 1 depicts one embodiment of a computing environment to incorporate and use one or more aspects of the present invention.

One embodiment of a computing environment to incorporate and use one or more aspects of the present invention is described with reference to FIG. 1. In one example, a computing environment 100 is a System z® server offered by International Business Machines Corporation. System z® is based on the z/Architecture® offered by International Business Machines Corporation. Details regarding the z/Architecture® are described in an IBM® publication entitled, "z/Architecture Principles of Operation," IBM Publication No. SA22-7832-07, February 2009, which is hereby incorporated herein by reference in its entirety. IBM®, System z® and z/Architecture® are registered trademarks of International Business Machines Corporation, Armonk, N.Y. Other names used herein may be registered trademarks, trademarks or product names of International Business Machines Corporation or other companies.

In one example, computing environment 100 includes a processing unit, such as a central processing complex 102, coupled to a system memory 104 (a.k.a., main memory) via a memory controller 106. Memory controller 106 receives read or write requests from the central processing complex and accesses the system memory for the central processing complex. Memory controller 106 is, for instance, comprised of hardware and is used to arbitrate for access to the system memory and to maintain the memory's consistency. This arbitration is performed for a request received from the central processing complex, as well as for a request received from one or more adapters 110. Like the central processing units, the adapters issue requests to system memory 104 to gain access to the system memory.

Adapter 110 is, for example, a Peripheral Component Interconnect (PCI) or PCI Express (PCIe) adapter that includes one or more PCI functions. A PCI function issues a request that requires access to system memory. The request is routed to an input/output hub 112 (e.g., a PCI hub) via one or more switches (e.g., PCIe switches) 114. In one example, the input/output hub is comprised of hardware, including one or more state machines. The input/output hub is coupled to memory controller 106 via an I/O-to-memory bus 118.

Central processing complex 102 includes, for instance, one or more partitions or zones 130 (e.g., logical partitions LP1-LPn), one or more central processors 132 (e.g., CP1-CPm), and a hypervisor 134 (e.g., a logical partition manager), each of which is described below.

Each logical partition 130 is capable of functioning as a separate system. That is, each logical partition can be independently reset, initially loaded with an operating system or a hypervisor (such as z/VM® offered by International Business Machines Corporation, Armonk, N.Y.), if desired, and operate with different programs. An operating system, a hypervisor, or an application program running in a logical partition appears to have access to a full and complete system, but only a portion of it is available. A combination of hardware and Licensed Internal Code (also referred to as microcode or millicode) keeps a program in a logical partition from interfering with the program in a different logical partition. This allows several different logical partitions to operate on a single or multiple physical processor in a time slice manner. In this particular example, each logical partition has a resident operating system 136, which may differ for one or more logical partitions. In one embodiment, operating system 136 is a z/OS® or zLinux operating system, offered by International Business Machines Corporation, Armonk, N.Y. z/OS® and z/VM® are registered trademarks of International Business Machines Corporation, Armonk, N.Y.

Central processors 132 are physical processor resources that are allocated to the logical partitions. For instance, a logical partition 130 includes one or more logical processors, each of which represents all or a share of the physical processor resource 132 allocated to the partition. The underlying processor resource may either be dedicated to that partition or shared with another partition.

Logical partitions 130 are managed by hypervisor 134 implemented by firmware running on processors 132. Logical partitions 130 and hypervisor 134 each comprise one or more programs residing in respective portions of central storage associated with the central processors. One example of hypervisor 134 is the processor Resource/Systems Manager (PR/SM), offered by International Business Machines Corporation, Armonk, N.Y.

Although, in this example, a central processing complex having logical partitions is described, one or more aspects of the present invention may be incorporated in and used by other processing units, including single or multi-processor processing units that are not partitioned, among others. The central processing complex described herein is only one example.

Further details regarding I/O hub 112 are described with reference 2A. In one example, I/O hub 112 includes a device table 200 having one or more device table entries 202. There is one device table entry (DTE) per adapter or adapter function. That is, in one particular example, there is one adapter function per adapter, and therefore, one DTE per adapter or adapter function. In other embodiments, there may be one DTE per adapter regardless of the number of adapter functions, or one DTE per adapter function, depending on needs and implementation. Further, an adapter may have a plurality of system memory address spaces assigned thereto, and then, there may be one DTE per address space of the adapter.

A device table entry for a particular adapter is located using, for instance, an index into the table. The index is based on, for instance, a requestor identifier (RID) associated with the adapter. Each device table entry 202 includes one or more fields 204, each of which includes information associated with or used by the adapter assigned to the DTE. In one example, one of the fields includes an error indicator 206 that specifies whether the adapter is in an error state, and therefore, direct memory accesses to system memory and adapter interrupts, as examples, are to be blocked; and another field includes a load/store blocked indicator 208 that indicates whether load/store responses are to be blocked. In a further example, one indicator may be used to block all requests or other indicators may be used. The DTE may include more, less or different information depending on the operational parameters set for the adapter (e.g., parameters for address translations, interrupts, set error, set load/store etc.).

Figure 2A:
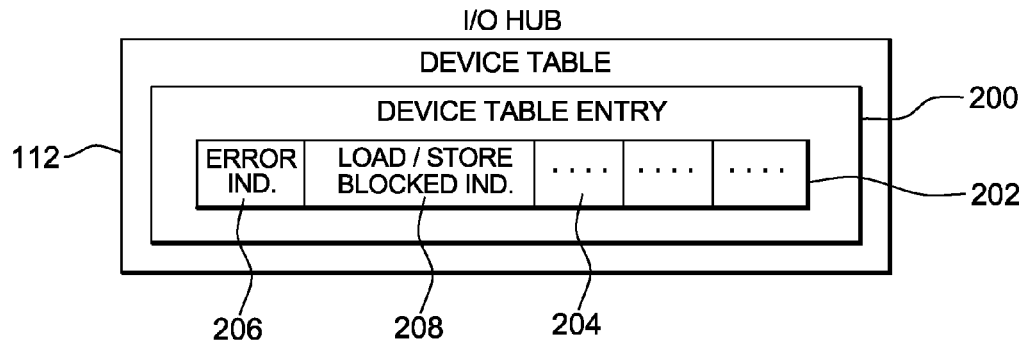
FIG. 2A depicts further details regarding an input/output (I/O) hub of the computing environment of FIG. 1, in accordance with an aspect of the present invention.
Figure 2B:
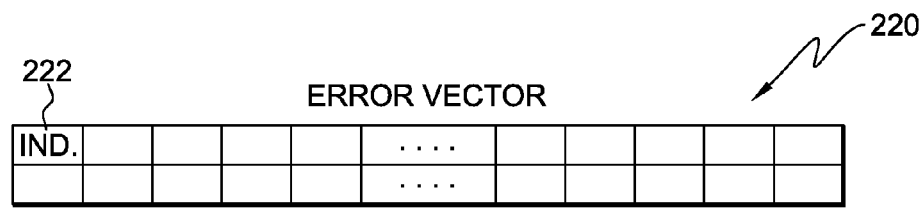
FIG. 2B depicts one example of an error vector used in accordance with an aspect of the present invention.

Associated with a device table entry, in one embodiment, is an error vector 220, an example of which is depicted in FIG. 2B. Error vector 220 is, for instance, stored in secure memory (e.g., memory managed by firmware) and includes a plurality of indicators 222, each associated with an adapter and indicating whether its associated adapter has a problem. For instance, there is one indicator (e.g., bit) per adapter and when the indicator is on (e.g., set to one), a problem, such as an error, is indicated. In one example, the base address of the error vector is stored in the I/O hub, and a particular indicator is located using the base address plus the index used to locate the DTE.

Associated with each indicator in the error vector is a function table entry that is used to prevent native PCI instructions from successfully accessing the adapter indicated in the error vector. The function table entry is an entry in a function table stored in secure memory, in one example. Each function table entry is located using, for instance, a portion of a function handle (described below) associated with the function table entry. The handle portion is used as an index into the function table to locate a function table entry.

Figure 2C:
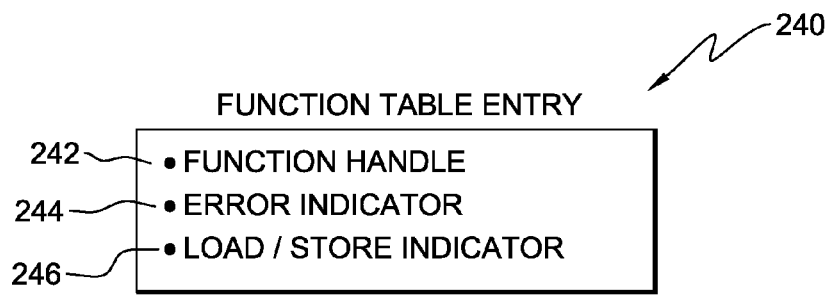
FIG. 2C depicts one example of a function table entry used in accordance with an aspect of the present invention.

As depicted in FIG. 2C, each function table entry 240 includes, for instance:
  A function handle 242 that identifies an instance of the adapter associated with the error vector indicator. In one example, the function handle includes an enable indicator indicating whether the handle is enabled; a function number that identifies an adapter function (this is a static identifier and may be used to index into a function table to locate an entry that includes operational parameters for the adapter function); and an instance number specifying a particular instance of the handle;
  An error indicator 244 that is associated with an error indicator in the DTE that is used to block interrupts (e.g., message signaled interrupts (MSIs)) and direct memory accesses (DMAs); and
  A load/store indicator 246 used to block loads/stores (e.g., PCI loads/stores).
  The use of the indicators is described in further detail below.

Figure 2D:
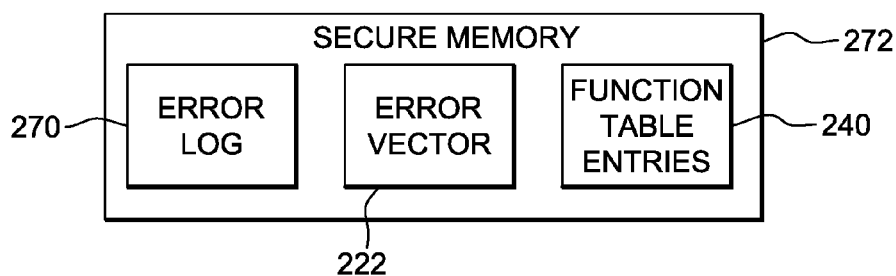
FIG. 2D depicts one example of an error log used in accordance with an aspect of the present invention.

Additionally, with reference to FIG. 2D, an error log 270 is provided that is also stored in secure memory. As shown, a secure memory 272 includes error vector 222, one or more function table entries 240, and error log 270. The error log is used, as described below, to provide further details regarding the error. In one example, there is one log entry per DTE. The base address of the log is stored in the I/O hub, and an entry is located using the base address and the index used to locate the DTE.

Figure 3A:
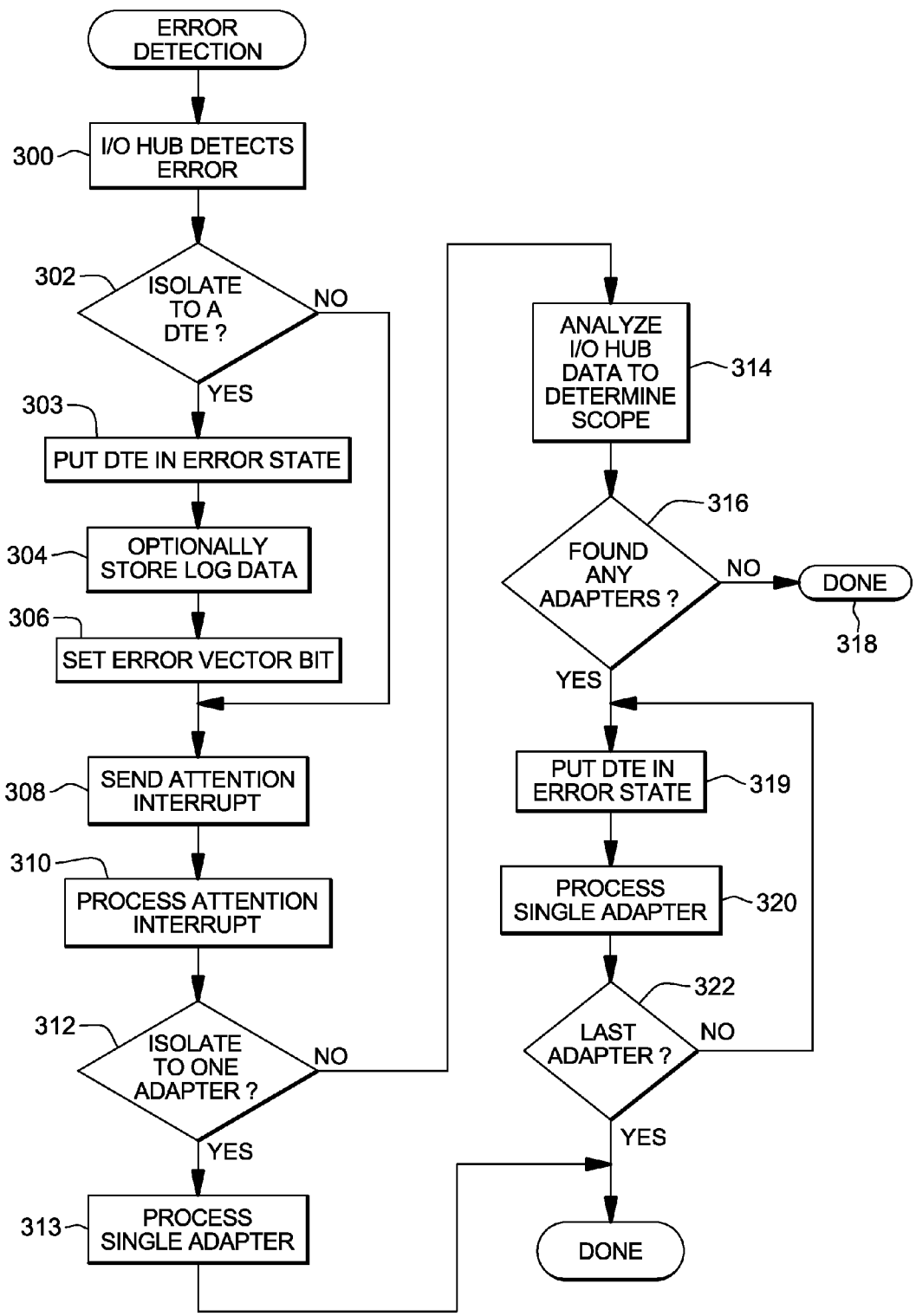
FIGS. 3A-3D depict one embodiment of the logic to perform error detection, notification and processing, in accordance with an aspect of the present invention.

One embodiment of the logic to detect an error, provide notification of the error, and have it processed is described with reference to FIGS. 3A-3D. Referring to FIG. 3A, initially, hardware, such as the I/O hub, detects an error, such as a PCI adapter error or a PCI switch error, as examples, STEP 300. For instance, the I/O hub receives an event or status update indicating an error. As an example, the I/O hub may detect an address translation error that occurred while the I/O hub was translating an address received from the adapter to an address usable by system memory.

A determination is then made as to whether the error can be isolated to a particular DTE, INQUIRY 302. This determination is made based on whether the I/O hub can determine the device table entry associated with the error. That is, does the I/O hub have the requestor id (RID) that can be used to access the appropriate device table entry. If the I/O hub can access the device table entry, then the error can be isolated to a particular adapter or bus within a switch.

If the error can be isolated to a particular device table entry, the device table entry is placed in the error state. This includes having the I/O hub set one or more indicators (e.g., a bit) in the device table entry, STEP 303. For instance, it can set the error indicator 206 and/or load/store blocked indicators 208. This causes requests from that adapter associated with the set indicators to be blocked.

Moreover, the I/O hub may or may not be able to generate an error log for the failure. If an error log is generated, an entry is stored in log 270, STEP 304. The log includes information regarding the error. For instance, if it is an address translation error, it indicates that error; it provides details of the error, such as it occurred while performing a second level translation table fetch; and it includes updating the failing PCI address, etc.

Additionally, the I/O hub turns on the error indicator in the error vector corresponding to the device table entry, STEP 306. This also indicates that a log was stored.

Subsequently, or if the error cannot be isolated to a DTE, the I/O hub sends an attention interrupt to the firmware of the central processing complex, STEP 308. Responsive to receiving the attention interrupt, the firmware analyzes the interrupt information, STEP 310. A determination is made as to whether the error can be isolated to a particular adapter (i.e., the DTE is associated with an adapter or switch), INQUIRY 312. In this situation, this determination is made by, for instance, checking the RID. If the RID is for an adapter, as opposed to a switch, as determined by a table or other data structure created by firmware during its bus walk to learn the configuration, then the error can be isolated to an adapter. That adapter is processed, as described below, STEP 313. However, if the error cannot be isolated to a particular adapter, then the firmware analyzes additional I/O hub information (e.g., other hardware registers) to determine the scope of the problem, STEP 314. That is, information is checked to determine the source of the problem, which may be other than an adapter, such as a switch coupled to one or more adapters or other hardware component.

Thereafter, a determination is made as to whether any adapters were found that are affected by the problem, INQUIRY 316. For instance, if it is a switch, are there any adapters coupled thereto. If there are no adapters that can be isolated by the firmware, processing is complete, STEP 318. However, for each adapter that is found to be affected, the device table entry for that adapter is placed in an error state by the firmware (e.g., the error indicator and/or load/store blocked indicator is set; e.g., =1), STEP 319, and that adapter is processed, STEP 320, as described below. A determination is made as to whether this is the last adapter found to be affected by the problem, INQUIRY 322. If so, then processing is complete, STEP 324. Otherwise, processing continues with STEP 319 "PUT DTE IN ERROR STATE."

Figure 3B:
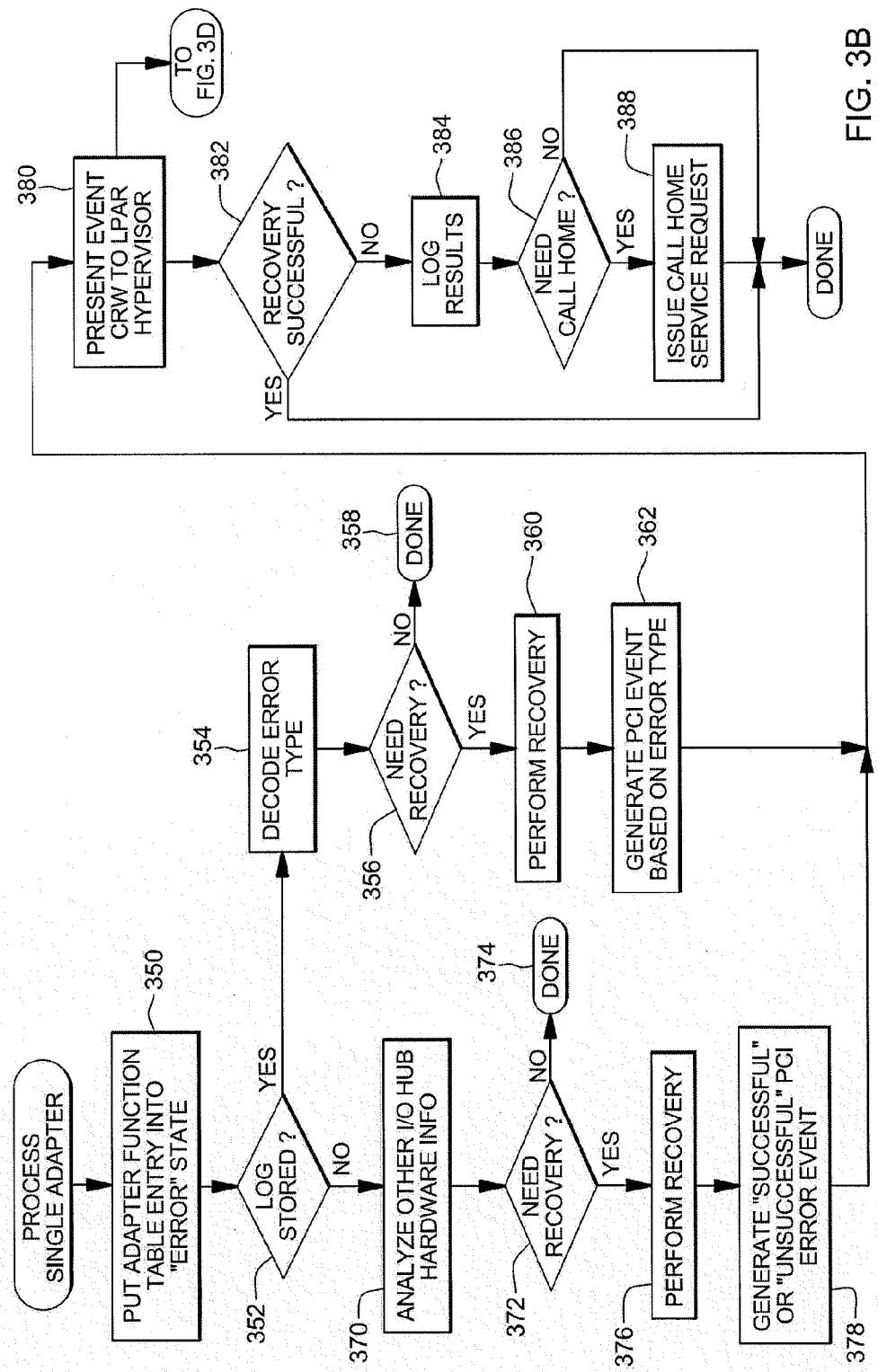

One embodiment of the logic to process a single adapter is described with reference to FIG. 3B. This logic is performed by the firmware, in one example. Initially, the function table entry associated with the adapter is placed into the error state, STEP 350. For instance, one or more indicators in the function table entry that are associated with the adapter are set to block access. For example, the error indicator may be set to block interrupts (e.g., MSIs) and direct memory accesses, and/or the load/store indicator may be set to block PCI load/stores. This prevents native PCI instructions from successfully accessing an adapter associated with the failing device table entry.

Thereafter, a determination is made as to whether a log was stored, INQUIRY 352. This determination is made by checking the log indicator in the error vector corresponding to the DTE. If an error log was stored, the firmware accesses the error log entry associated with the adapter in error (e.g., use the DTE index to index into the error log to find the appropriate entry) and decodes the error type from the log, STEP 354. A determination is made as to whether recovery is needed by the hardware (e.g., firmware, adapter), INQUIRY 356. For instance, if the log indicates that the error was caused by software (e.g., the operating system), then recovery is not needed by the hardware and the single adapter processing is complete, STEP 358. In this situation, the operating system will perform recovery, but does not need to take explicit action to put the adapter in the error state. The recovery will depend on the error.

Returning to INQUIRY 356, if recovery is to be performed by the hardware/firmware, then recovery is performed, STEP 360. For instance, the adapter is reset, or deconfigured and reconfigured, etc.

Additionally, the firmware creates an appropriate PCI function error event for the error type, STEP 362. In one example, this is an architected channel subsystem event that is held pending in secure memory by firmware. As one example, the error event includes the following information: owning partition (i.e., the logical partition accessing the adapter); function handle; physical identifier of the adapter; PCI event code describing the event; an indication whether recovery was successful; and possible error details. The error details depend on the type of error. For example, for direct memory access errors, the error details include the failing address, read/write indicator, translation error details, and DMA address space affected, as examples; for interrupt errors, the error details include, for instance, the failing address and translation error details; for bus errors, the error details include key/uncorrectable errors during DMA/interrupt operations, and failing address as available, for example; for PCI related partition storage access, the error details include failing address and type of access error, as examples; for PCI errors, no error details are reported in this example. This category covers hardware events where local error information is stored only in the error log.

Returning to INQUIRY 352, if a log was not stored, other I/O hub hardware information (e.g., other registers) is analyzed, STEP 370. A determination is made, based on this analysis, whether recovery is needed by the hardware, STEP 372. If not, then the single adapter processing is complete, STEP 374. Otherwise, recovery is performed by, for instance, the hardware, STEP 376.

Further, a PCI function error event is created indicating the success of the recovery, STEP 378. In one embodiment, the firmware holds this event pending in secure memory.

After generating a successful or unsuccessful PCI error event, STEP 378, or a PCI event based on error type, STEP 362, processing proceeds with presenting the event to the LPAR hypervisor (or operating system in a non-LPAR environment), STEP 380. For example, a channel report word (CRW) informing the hypervisor of the error is presented to the hypervisor.

Subsequent to presenting the event CRW to the LPAR hypervisor, which is discussed more fully below, a determination is made as to whether recovery was successful, INQUIRY 382. This determination is based on information obtained by firmware from the I/O hub and adapter hardware during the recovery process. If recovery was successful, then processing is complete. However, if recovery was unsuccessful, then the firmware initiates creation of a log describing the event, STEP 384. For example, firmware sends a request to a service processor to create an entry in the system log. Included in the log is a Service Reference Code (SRC) that describes the event.

The service processor receives the service request and analyzes the request to determine whether a call home is needed, INQUIRY 386. In this example, "call home" refers to providing an error report to a particular entity, such as IBM®, and requesting a repair or maintenance action be taken. That is, even though the firmware may have taken an action based on the error, such as a reset, deconfigure, etc., a repair action is requested indicating that the adapter needs servicing (e.g., a physical repair). This determination of whether "call home" is needed depends on the value of the service code provided in the service request. If call home is needed, then the "call home" service request is issued, STEP 388. Thereafter, or if call home is not needed, then processing is complete.

Figure 3C:
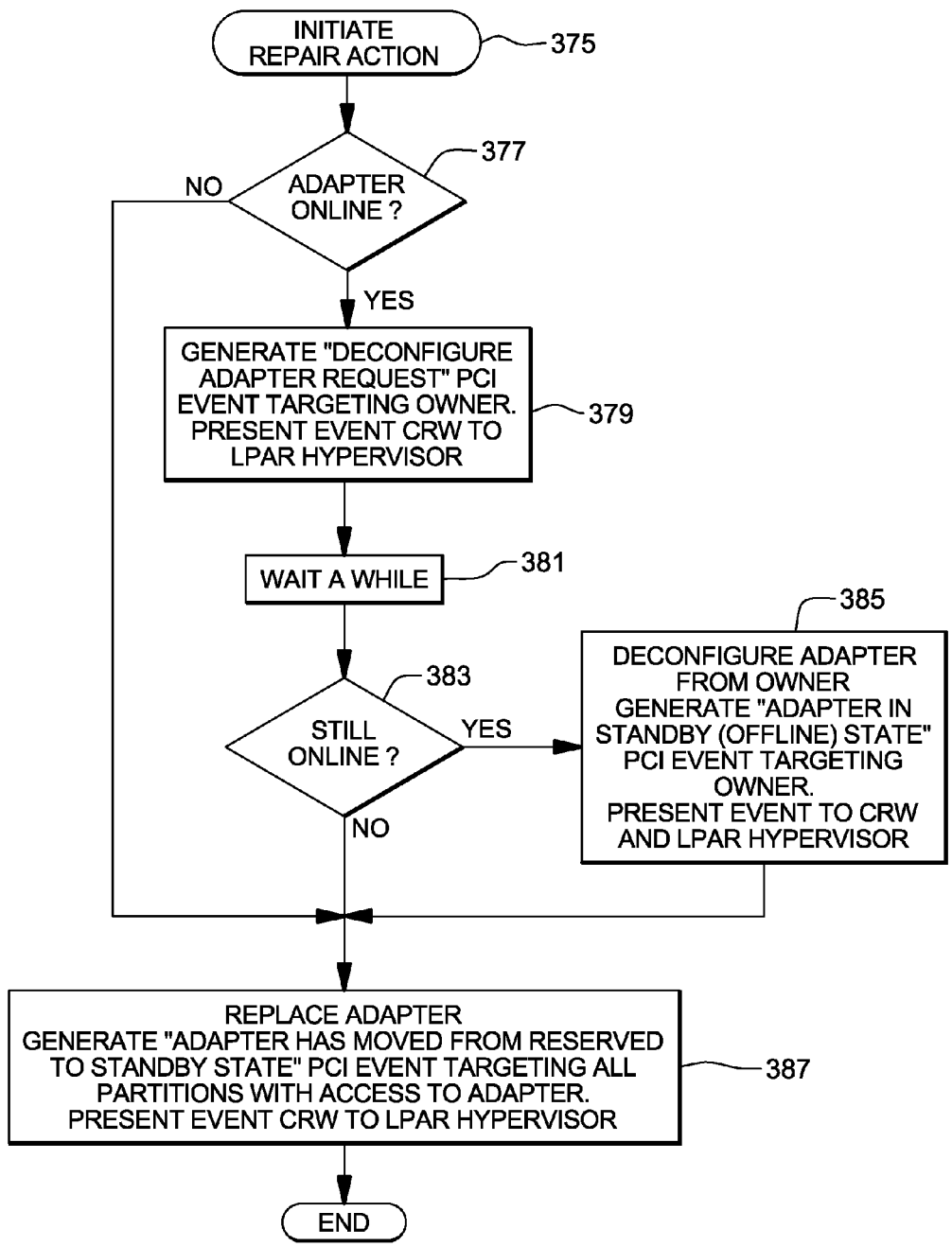
Figure 3D:
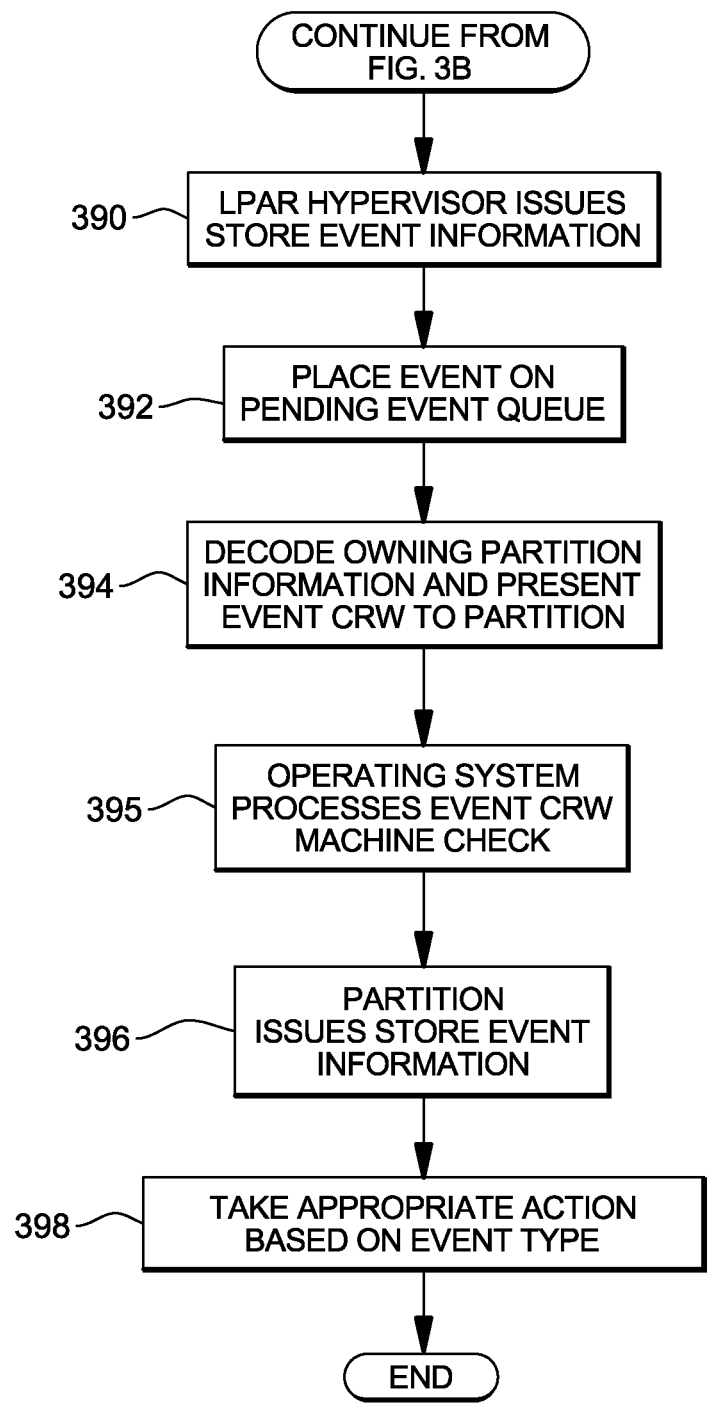

In one example, in which recovery has failed and a "call home" has been issued, a service action is scheduled, STEP 375 (FIG. 3C). In performing the service action, which may include replacing the adapter, a series of actions take place on the hardware and firmware, as described below.

The repair sequence is initiated from an entity, such as a service processor which has a user interface through which repairs can be managed. The firmware determines if the adapter being replaced is currently online to its owner, INQUIRY 377. If it is, an architected event requesting that the adapter be deconfigured is created and held pending in secure memory by firmware, STEP 379. The firmware presents an event CRW to the LPAR hypervisor for the function, and the LPAR hypervisor issues a Store Event Information command (e.g., of a Channel Subsystem Call instruction) to obtain the information. The LPAR decodes the owning partition information in the architected event and presents an event CRW to the appropriate partition. The operating system then deconfigures the adapter.

The firmware waits a while, STEP 381, and then determines if the adapter is still online, INQUIRY 383. If so, the firmware will forcibly deconfigure the adapter, STEP 385. The firmware generates an architected event that targets the owner indicating that the adapter is in a standby (offline) state, and holds this pending in secure memory. The firmware presents an event CRW to the LPAR hypervisor for the function, and the LPAR hypervisor issues a Store Event Information command to obtain the information. The LPAR hypervisor decodes the owning partition information in the architected event and presents an event CRW to the appropriate partition.

When the adapter is deconfigured from its owner, firmware creates an architected event indicating the adapter is now offline to its owner and holds it pending in secure memory. The firmware presents an event CRW to the LPAR hypervisor for the function, and the LPAR hypervisor issues a Store Event Information command to obtain the information. The LPAR hypervisor decodes the owning partition information in the architected event and presents an event to the appropriate partition.

Thereafter, when the adapter is offline (INQUIRY 377, INQUIRY 383), power to the adapter is shut down and the adapter is physically removed, STEP 387. Internal firmware control structures are updated to indicate that the adapter is no longer installed.

Next, the new adapter is installed. Responsive thereto, internal firmware control structures are updated to indicate that the adapter is now installed. Power to the adapter is restored. Firmware creates an architected event in secure memory indicating that the adapter is now available to be configured to a partition. This event includes a list of partitions that have access defined for this adapter in the I/O configuration data set (IOCDS). The firmware presents an event CRW to the LPAR hypervisor for the function, and the LPAR hypervisor issues a Store Event Information command to obtain the information. LPAR decodes the owning partitions from the architected event and gives the event to all partitions that have access to the adapter defined in the IOCDS.

Returning to FIG. 3B and particularly, STEP 380, the processing of the event CRW by the hypervisor is further described. Responsive to receiving the event CRW, the LPAR hypervisor retrieves the information from the event, STEP 390. In one example, it issues a Store Event Information command (e.g. of a Channel Subsystem Call instruction), to retrieve the information. The Store Event Information command includes a request block requesting the stored information, and a response block that will include the retrieved information.

Further, the LPAR hypervisor puts the event on a pending event queue for the partition, STEP 392. The LPAR hypervisor decodes the owning partition information and presents an event CRW to the appropriate partition, STEP 394.

The operating system processes an event CRW machine check, STEP 395. Further, it issues a Store Event Information command to obtain event information regarding the error (or action), STEP 396.

In particular, in one example, the Store Event Information command is executed by the firmware and returns a response block that includes, for instance, the function handle specifying the adapter that is associated with this event; a function identifier that identifies the adapter; an event code that describes the reason for the adapter error event notification; and possibly other information depending on the event code. Example event codes include:

An Address Translation Protection Exception. A direct memory access (DMA) write operation was attempted when the storage protection bit in a translation table entry was one. In this instance, an event qualifier is provided that indicates the error condition is associated with processing a translation table entry. Further, the following information is returned: an expected table type indicating the expected table type of the failing translation table entry; a failing address that includes the address that is associated with the PCI function error condition; a DMA address space which identifies the DMA address space associated with the failed DMA operation; and a read/write indicator that indicates whether the PCI function error condition is associated with a DMA read or write operation.

The PCI function was not registered for adapter interruptions when a message signaled interrupt (MSI) request was received from the PCI function. In this instance, the event qualifier that is returned is set to indicate that the PCI function error condition is associated with a failed MSI. Additionally, the following information is returned: an MSI vector number that specifies the MSI vector number associated with a failed MSI for the PCI function (the MSI vector number is the offset of the bit in an adapter interruption bit vector which was requested to be set to one); read/write indicator that indicates whether the PCI function error condition is associated with a DMA read or write operation; and a failing address that indicates the address that is associated with the PCI function error condition.

PCI function recovery successful. The PCI function is in the error state. An error was encountered with the PCI function, but has successfully recovered.

PCI function recovery unsuccessful. The PCI function remains configured, but in a permanent error state. The enabled PCI function handle stored for this event identifies the PCI function in error, but is no longer usable.

Many other event codes may be provided and the those provided herein are just offered as examples. Furthermore, more, less or different information may be returned depending on the event code that is provided and/or depending on implementation.

Responsive to obtaining the error information, the operating system takes appropriate action based on the event type. Further, the operating system issues a Modify PCI Function controls instruction to unblock instruction access (e.g., PCI loads and stores) and to re-enable DMAs and MSIs (interrupts).

Figure 4A:
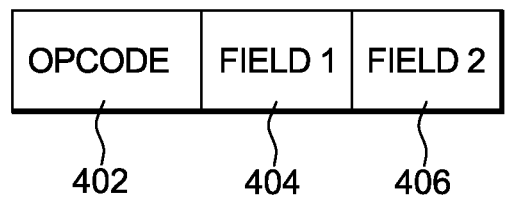
FIG. 4A depicts one embodiment of a Modify PCI Function Controls instruction used in accordance with an aspect of the present invention.

Further details regarding the Modify PCI Function Controls instruction are described herein. Referring to FIG. 4A, a Modify PCI Function Controls instruction 400 includes, for instance, an op code 402 indicating the Modify PCI Function Controls instruction; a first field 404 specifying a location at which various information is included regarding the adapter function for which the operational parameters are being established; and a second field 406 specifying a location from which a PCI function information block (FIB) is fetched. The contents of the locations designated by Fields 1 and 2 are further described below.

Figure 4B:
FIG. 4B depicts one embodiment of a field used by the Modify PCI Function Controls instruction of FIG. 4A, in accordance with an aspect of the present invention.

In one embodiment, Field 1 designates a general register that includes various information. As shown in FIG. 4B, the contents of the register include, for instance, a function handle 410 that identifies the handle of the adapter function on behalf of which the modify instruction is being performed; an address space 412 designating an address space in system memory associated with the adapter function designated by the function handle; an operation control 414 which specifies the operation to be performed for the adapter function; and status 416 which provides status regarding the instruction when the instruction completes with a predefined code.

In one embodiment, the function handle includes, for instance, an enable indicator indicating whether the handle is enabled, a function number that identifies an adapter function (this is a static identifier and may be used to index into a function table); and an instance number specifying the particular instance of this function handle. There is one function handle for each adapter function, and it is used to locate a function table entry (FTE) within the function table. Each function table entry includes operational parameters and/or other information associated with its adapter function. As one example, a function table entry includes:

Instance Number: This field indicates a particular instance of the adapter function handle associated with the function table entry;

Device Table Entry (DTE) Index 1 . . . n: There may be one or more device table indices, and each index is an index into a device table to locate a device table entry (DTE). There are one or more device table entries per adapter function, and each entry includes information associated with its adapter function, including information used to process requests of the adapter function (e.g., DMA requests, MSI requests) and information relating to requests associated with the adapter function (e.g., PCI instructions). Each device table entry is associated with one address space within system memory assigned to the adapter function. An adapter function may have one or more address spaces within system memory assigned to the adapter function.

Busy Indicator: This field indicates whether the adapter function is busy;

Permanent Error State Indicator: This field indicates whether the adapter function is in a permanent error state;

Recovery Initiated Indicator: This field indicates whether recovery has been initiated for the adapter function;

Permission Indicator: This field indicates whether the operating system trying to control the adapter function has authority to do so;

Enable Indicator: This field indicates whether the adapter function is enabled (e.g., 1=enabled, 0=disabled);

Requestor Identifier (RID): This is an identifier of the adapter function, and includes, for instance, a bus number, a device number and a function number.

In one example, this field is used for accesses of a configuration space of the adapter function. (Memory of an adapter may be defined as address spaces, including, for instance, a configuration space, an I/O space, and/or one or more memory spaces.) In one example, the configuration space may be accessed by specifying the configuration space in an instruction issued by the operating system (or other configuration) to the adapter function. Specified in the instruction is an offset into the configuration space and a function handle used to locate the appropriate function table entry that includes the RID. The firmware receives the instruction and determines it is for a configuration space. Therefore, it uses the RID to generate a request to the I/O hub, and the I/O hub creates a request to access the adapter. The location of the adapter function is based on the RID, and the offset specifies an offset into the configuration space of the adapter function.

Base Address Register (BAR) (1 to n): This field includes a plurality of unsigned integers, designated as $BAR_0$-$BAR_N$, which are associated with the originally specified adapter function, and whose values are also stored in the base address registers associated with the adapter function. Each BAR specifies the starting address of a memory space or I/O space within the adapter function, and also indicates the type of address space, that is whether it is a 64 or 32 bit memory space, or a 32 bit I/O space, as examples;

In one example, it is used for accesses to memory space and/or I/O space of the adapter function. For instance, an offset provided in an instruction to access the adapter function is added to the value in the base address register associated with the address space designated in the instruction to obtain the address to be used to access the adapter function. The address space identifier provided in the instruction identifies the address space within the adapter function to be accessed and the corresponding BAR to be used;

Size 1 . . . n: This field includes a plurality of unsigned integers, designated as $SIZE_0$-$SIZE_n$. The value of a Size field, when non-zero, represents the size of each address space with each entry corresponding to a previously described BAR.

Further details regarding BAR and Size are described below.
1. When a BAR is not implemented for an adapter function, the BAR field and its corresponding size field are both stored as zeros.
2. When a BAR field represents either an I/O address space or a 32-bit memory address space, the corresponding size field is non-zero and represents the size of the address space.
3. When a BAR field represents a 64-bit memory address space,
    a. The $BAR_n$ field represents the least significant address bits.
    b. The next consecutive $BAR_{n+1}$ field represents the most significant address bits.
    c. The corresponding $SIZE_n$ field is non-zero and represents the size of the address space.
    d. The corresponding $SIZE_{n+1}$ field is not meaningful and is stored as zero.

Internal Routing Information: This information is used to perform particular routing to the adapter. It includes, for instance, node, processor chip, and hub addressing information, as examples.

Status Indication: This provides an indication of, for instance, whether load/store operations are blocked or the adapter is in the error state, as well as other indications.

In one example, the busy indicator, permanent error state indicator, and recovery initiated indicator are set based on monitoring performed by the firmware. Further, the permission indicator is set, for instance, based on policy; and the BAR information is based on configuration information discovered during a bus walk by the processor (e.g., firmware of the processor). Other fields may be set based on configuration, initialization, and/or events. In other embodiments, the function table entry may include more, less or different information. The information included may depend on the operations supported by or enabled for the adapter function.

Figure 4C:
FIG. 4C depicts one embodiment of another field used by the Modify PCI Function Controls instruction of FIG. 4A, in accordance with an aspect of the present invention.

Referring to FIG. 4C, in one example, Field 2 designates a logical address 420 of a PCI function information block (FIB), which includes information regarding an associated adapter function. The function information block is used to update a device table entry and/or function table entry (or other location) associated with the adapter function. The information is stored in the FIB during initialization and/or configuration of the adapter, and/or responsive to particular events.

Figure 4D:
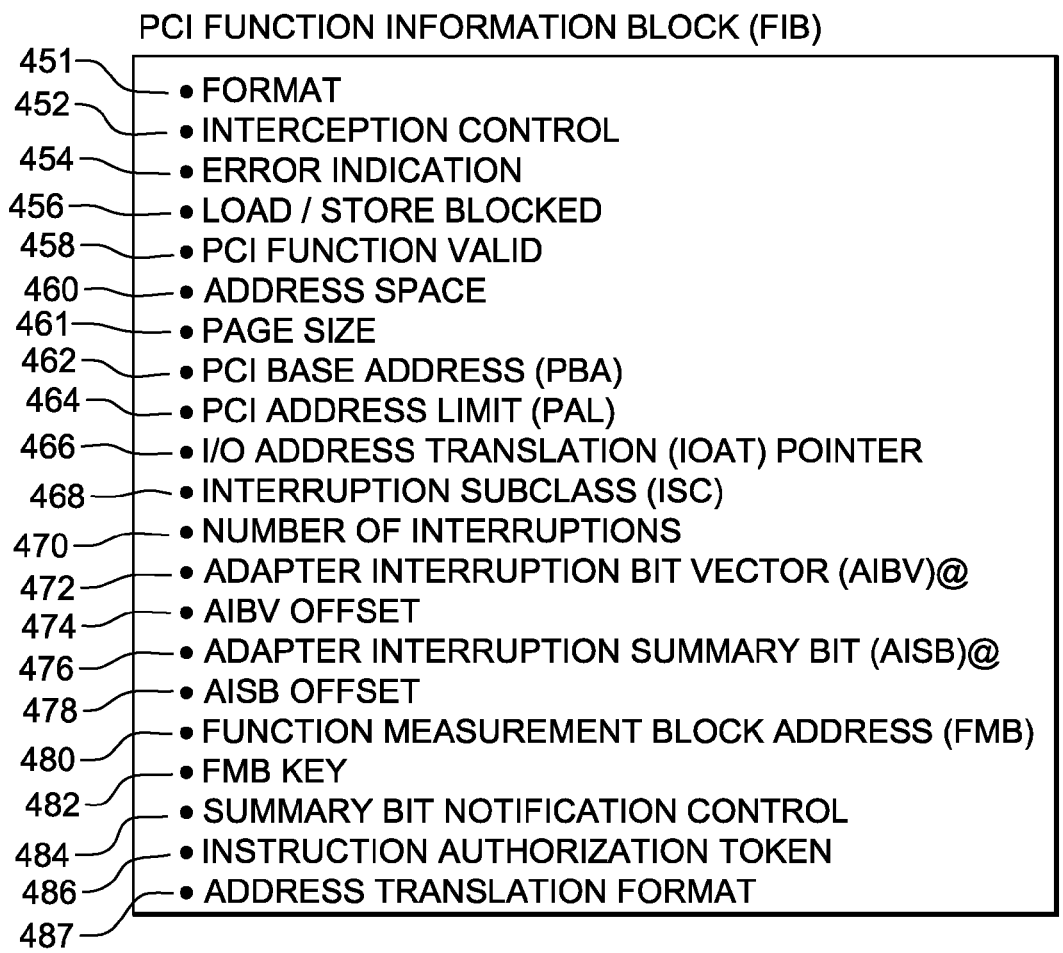
FIG. 4D depicts one embodiment of the contents of a function information block (FIB) used in accordance with an aspect of the present invention.

Further details regarding a function information block (FIB) are described with reference to FIG. 4D. In one embodiment, a function information block 450 includes the following fields:

Format 451: This field specifies the format of the FIB.

Interception Control 452: This field is used to indicate whether guest execution of specific instructions by a pageable mode guest results in instruction interception;

Error Indication 454: This field includes the error state indication for direct memory access and adapter interruptions. When the bit is set (e.g., 1), one or more errors have been detected while performing direct memory access or adapter interruption for the adapter function;

Load/Store Blocked 456: This field indicates whether load/store operations are blocked;

PCI Function Valid 458: This field includes an enablement control for the adapter function. When the bit is set (e.g., 1), the adapter function is considered to be enabled for I/O operations;

Address Space Registered 460: This field includes a direct memory access enablement control for an adapter function. When the field is set (e.g., 1) direct memory access is enabled;

Page Size 461: This field indicates the size of the page or other unit of memory to be accessed by a DMA memory access;

PCI Base Address (PBA) 462: This field is a base address for an address space in system memory assigned to the adapter function. It represents the lowest virtual address that an adapter function is allowed to use for direct memory access to the specified DMA address space;

PCI Address Limit (PAL) 464: This field represents the highest virtual address that an adapter function is allowed to access within the specified DMA address space;

Input/Output Address Translation Pointer (IOAT) 466: The input/output address translation pointer designates the first of any translation tables used by a PCI virtual address translation, or it may directly designate the absolute address of a frame of storage that is the result of translation;

Interruption Subclass (ISC) 468: This field includes the interruption subclass used to present adapter interruptions for the adapter function;

Number of Interruptions (NOI) 470: This field designates the number of distinct interruption codes accepted for an adapter function. This field also defines the size, in bits, of the adapter interruption bit vector designated by an adapter interruption bit vector address and adapter interruption bit vector offset fields;

Adapter Interruption Bit Vector Address (AIBV) 472: This field specifies an address of the adapter interruption bit vector for the adapter function. This vector is used in interrupt processing;

Adapter Interruption Bit Vector Offset 474: This field specifies the offset of the first adapter interruption bit vector bit for the adapter function;

Adapter Interruption Summary Bit Address (AISB) 476: This field provides an address designating the adapter interruption summary bit, which is optionally used in interrupt processing;

Adapter Interruption Summary Bit Offset 478: This field provides the offset into the adapter interruption summary bit vector;

Function Measurement Block (FMB) Address 480: This field provides an address of a function measurement block used to collect measurements regarding the adapter function;

Function Measurement Block Key 482: This field includes an access key to access the function measurement block;

Summary Bit Notification Control 484: This field indicates whether there is a summary bit vector being used;

Instruction Authorization Token 486: This field is used to determine whether a pageable storage mode guest is authorized to execute PCI instructions without host intervention.

In one example, in the z/Architecture®, a pageable guest is interpretively executed via the Start Interpretive Execution (SIE) instruction, at level 2 of interpretation. For instance, the logical partition (LPAR) hypervisor executes the SIE instruction to begin the logical partition in physical, fixed memory. If z/VM® is the operating system in that logical partition, it issues the SIE instruction to execute its guests (virtual) machines in its V=V (virtual) storage. Therefore, the LPAR hypervisor uses level-1 SIE, and the z/VM® hypervisor uses level-2 SIE; and Address Translation Format 487: This field indicates a selected format for address translation of the highest level translation table to be used in translation (e.g., an indication of highest level table (e.g. segment table, region 3rd, etc.) and an indication of the selected format (e.g., CPU DAT compatible, I/O extended address translation format, a bypass format, a no fetch format). It may also indicate a format.

The function information block designated in the Modify PCI Function Controls instruction is used to modify a selected device table entry, a function table entry and/or other firmware controls associated with the adapter function designated in the instruction. By modifying the device table entry, function table entry and/or other firmware controls, certain services are provided for the adapter. These services include, for instance, adapter interruptions; address translations; reset error state; reset load/store blocked; set function measurement parameters; and set interception control.

One embodiment of the logic associated with the Modify PCI Function Controls instruction is described with reference to FIG. 5. In one example, the instruction is issued by an operating system (or other configuration) and executed by the processor (e.g., firmware) executing the operating system. In the examples herein, the instruction and adapter functions are PCI based. However, in other examples, a different adapter architecture and corresponding instructions may be used.

In one example, the operating system provides the following operands to the instruction (e.g., in one or more registers designated by the instruction): the PCI function handle; the DMA address space identifier; an operation control; and an address of the function information block.

Figure 5:
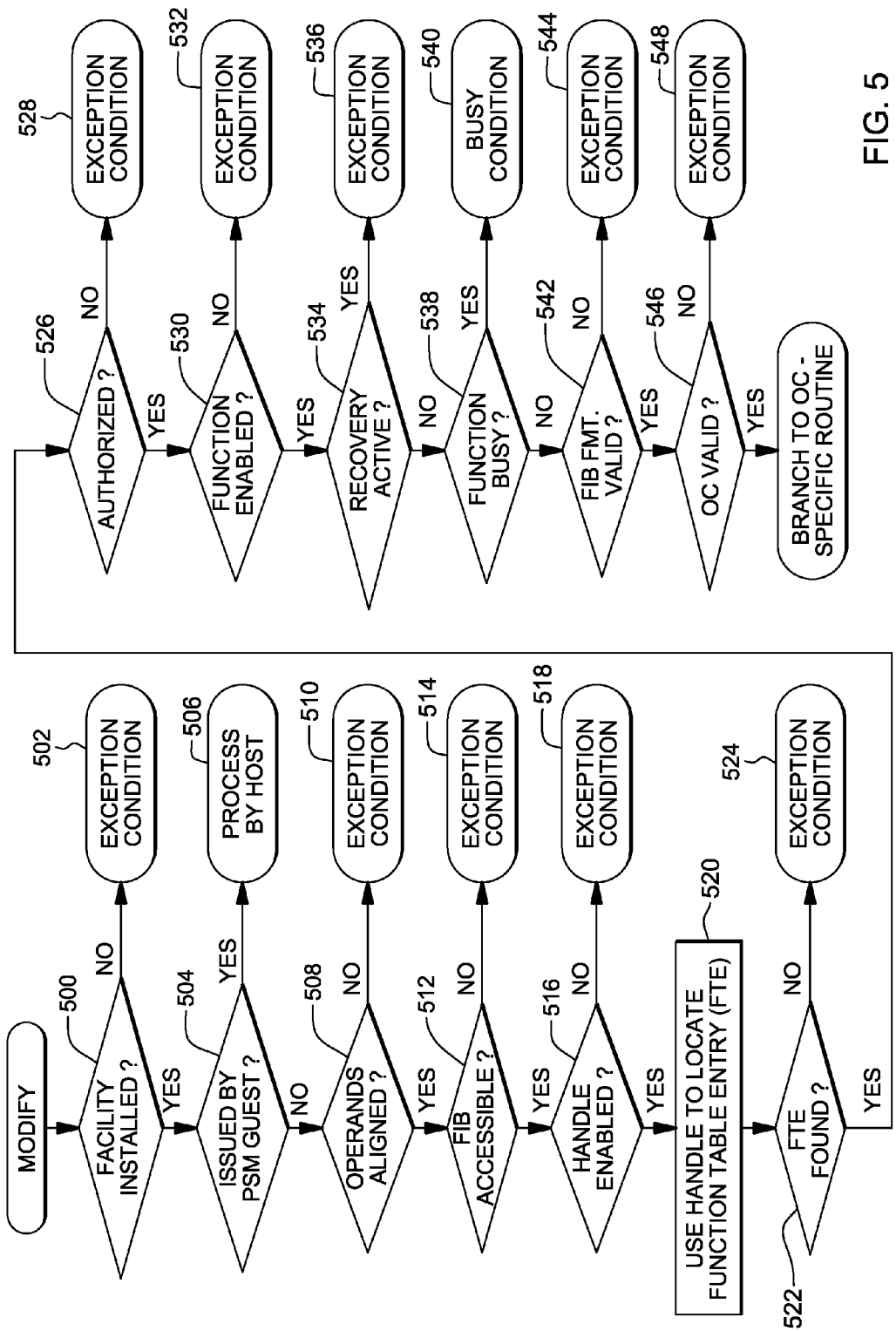
FIG. 5 depicts one embodiment of the logic associated with the Modify PCI Function Controls instruction, in accordance with an aspect of the present invention.

Referring to FIG. 5, initially, a determination is made as to whether the facility allowing for a Modify PCI Function Controls instruction is installed, INQUIRY 500. This determination is made by, for instance, checking an indicator stored in, for instance, a control block. If the facility is not installed, an exception condition is provided, STEP 502. Otherwise, a determination is made as to whether the instruction was issued by a pageable storage mode guest (or other guest), INQUIRY 504. If yes, the host operating system will emulate the operation for that guest, STEP 506.

Otherwise, a determination is made as to whether one or more of the operands are aligned, INQUIRY 508. For instance, a determination is made as to whether the address of the function information block is on a double word boundary. In one example, this is optional. If the operands are not aligned, then an exception condition is provided, STEP 510. Otherwise, a determination is made as to whether the function information block is accessible, INQUIRY 512. If not, then an exception condition is provided, STEP 514. Otherwise, a determination is made as to whether the handle provided in the operands of the Modify PCI Function Controls instruction is enabled, INQUIRY 516. In one example, this determination is made by checking an enable indicator in the handle. If the handle is not enabled, then an exception condition is provided, STEP 518.

If the handle is enabled, then the handle is used to locate a function table entry, STEP 520. That is, at least a portion of the handle is used as an index into the function table to locate the function table entry corresponding to the adapter function for which operational parameters are to be established.

A determination is made as to whether the function table entry was found, INQUIRY 522. If not, then an exception condition is provided, STEP 524. Otherwise, if the configuration issuing the instruction is a guest, INQUIRY 526, then an exception condition (e.g., interception to the host) is provided, STEP 528. This inquiry may be ignored if the configuration is not a guest or other authorizations may be checked, if designated.

A determination is then made as to whether the function is enabled, INQUIRY 530. In one example, this determination is made by checking an enable indicator in the function table entry. If it is not enabled, then an exception condition is provided, STEP 532.

If the function is enabled, then a determination is made as to whether recovery is active, INQUIRY 534. If recovery is active as determined by a recovery indicator in the function table entry, then an exception condition is provided, STEP 536. However, if recovery is not active, then a further determination is made as to whether the function is busy, INQUIRY 538. This determination is made by checking the busy indicator in the function table entry. If the function is busy, then a busy condition is provided, STEP 540. With the busy condition, the instruction can be retried, instead of dropped.

If the function is not busy, then a further determination is made as to whether the function information block format is valid, INQUIRY 542. For instance, the format field of the FIB is checked to determine if this format is supported by the system. If it is invalid, then an exception condition is provided, STEP 544. If the function information block format is valid, then a further determination is made as to whether the operation control specified in the operands of the instruction is valid, INQUIRY 546. That is, is the operation control one of the specified operation controls for this instruction. If it is invalid, then an exception condition is provided, STEP 548. However, if the operation control is valid, then processing continues with the specific operation control being specified.

Figure 6:
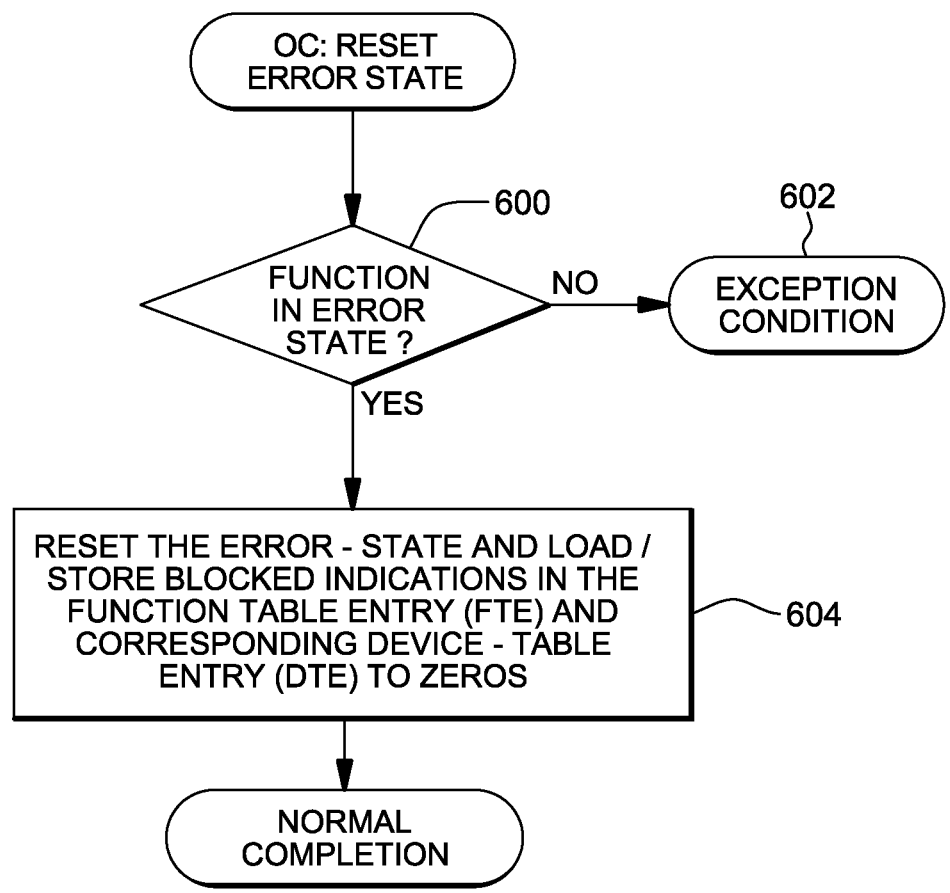
FIG. 6 depicts one embodiment of the logic associated with a reset error state indication operation that may be specified by the Modify PCI Function Controls instruction, in accordance with an aspect of the present invention.

One operation that can be performed is a reset error state indication operation used to reset error conditions, an example of which is described with reference to FIG. 6. With this operation, the error state and load/store blocked indications are set to zero, thus allowing the I/O hub to process subsequent DMAs and MSIs received from the adapter. In one embodiment, a determination is made as to whether the adapter function is in an error state, as indicated by the value of this parameter, INQUIRY 600. If not, then an exception condition is provided, STEP 602. Otherwise, the error state and load/store blocked indications in the function table entry and corresponding device table entry are reset to zeros, STEP 604.

Figure 7:
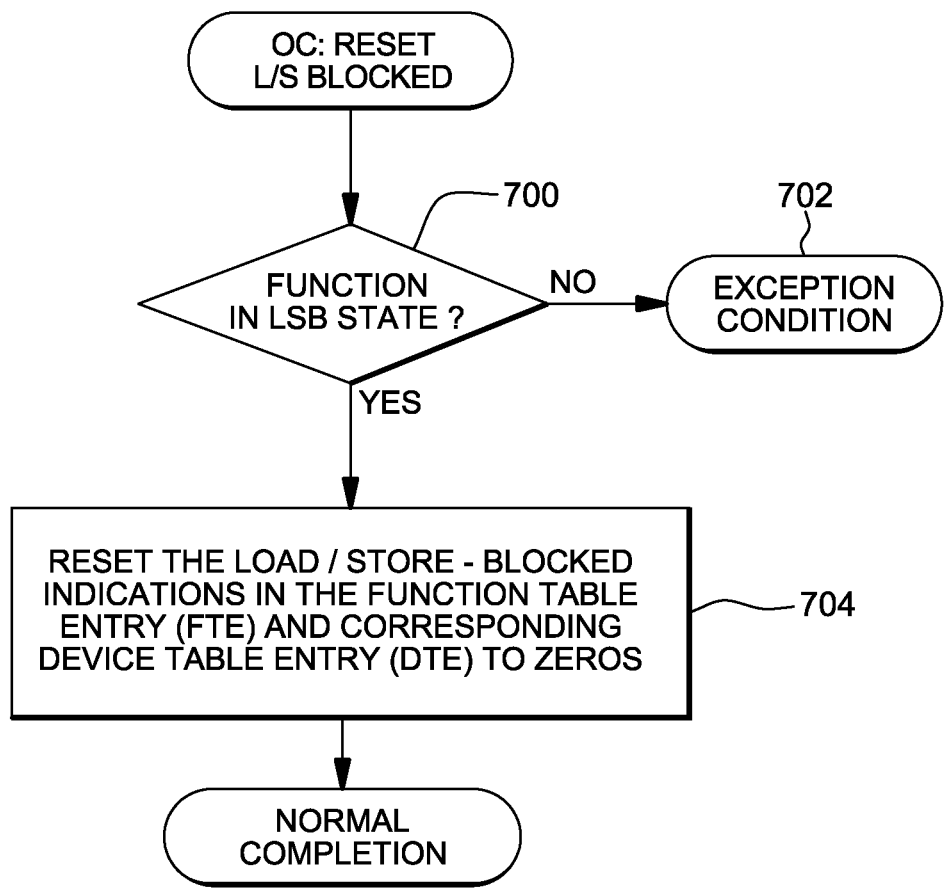
FIG. 7 depicts one embodiment of the logic associated with a reset load/store blocked indication operation that may be specified by the Modify PCI Function Controls instruction, in accordance with an aspect of the present invention.

Another operation control that may be specified is a reset load/store blocked indication operation. With this operation the load/store blocked indication is set to zero. One embodiment of the logic associated with this operation is described with reference to FIG. 7. Initially, a determination is made as to whether the function is in a load/store blocked state, as indicated by the value in this parameter, INQUIRY 700. If not, then an exception condition is provided, STEP 702. Otherwise, the load/store blocked indication in the function table entry and corresponding device table entry are reset to zeros, STEP 704.

Described in detail above is a device-independent infrastructure for reporting adapter errors to software (e.g., an operating system). This eliminates the risk of packets being dropped without notifying software. The device-independent infrastructure is a common infrastructure that allows reporting and recovery of errors that are common across adapter types, without requiring device-specific implementations. The device-independent infrastructure prevents access to PCI functions for which the hardware has detected errors.

When a PCI error that can be isolated to a particular device table entry is detected, the hardware creates an error log for the appropriate device table entry, if possible, and sends an interrupt to the firmware. The firmware determines the function table entry associated with the device table entry and sets indicators in the function table entry. Those indicators are examined by millicode and firmware when any instruction that accesses that PCI function is made. When they are set, the access is blocked.

Firmware accesses the error log entry and decodes the error type from the log. An architected event called a PCI function error is created and held pending in secure memory by firmware. The firmware presents an event to the LPAR hypervisor for each function table entry affected, and the LPAR hypervisor issues a Store Event Information channel subsystem call to obtain the information. The LPAR decodes the owning partition information in the architected event and presents an event to the appropriate partition.

In one aspect, the firmware takes an event that is detected and logged by the hardware, and manages that event to block the operating system from issuing further architected instructions to the adapter. Also, errors detected in the I/O infrastructure (e.g., PCIe) switches) are managed and adapters that are impacted are placed into the error state and informing the owning operating system that this has occurred. To minimize impacts to firmware and the operating systems, CRW and Store Event information is used with an architected event information that is specific to PCI adapters.

In the embodiments described herein, the adapters are PCI adapters. PCI, as used herein, refers to any adapters implemented according to a PCI-based specification as defined by the Peripheral Component Interconnect Special Interest Group (PCI-SIG), including but not limited to, PCI or PCIe. In one particular example, the Peripheral Component Interconnect Express (PCIe) is a component level interconnect standard that defines a bi-directional communication protocol for transactions between I/O adapters and host systems. PCIe communications are encapsulated in packets according to the PCIe standard for transmission on a PCIe bus. Transactions originating at I/O adapters and ending at host systems are referred to as upbound transactions. Transactions originating at host systems and terminating at I/O adapters are referred to as downbound transactions. The PCIe topology is based on point-to-point unidirectional links that are paired (e.g., one upbound link, one downbound link) to form the PCIe bus. The PCIe standard is maintained and published by the PCI-SIG.

Other applications filed on the same day include: U.S. Ser. No. 12/821,170, filed Jun. 23, 2010, entitled "Translation Of Input/Output Addresses To Memory Addresses," Craddock et al.; U.S. Ser. No. 12/821,171, filed Jun. 23, 2010, entitled "Runtime Determination Of Translation Formats For Adapter Functions," Craddock et al.; U.S. Ser. No. 12/821,172, filed Jun. 23, 2010, entitled "Resizing Address Spaces Concurrent To Accessing The Address Spaces," Craddock et al.; U.S. Ser. No. 12/821,174, filed Jun. 23, 2010, entitled "Multiple Address Spaces Per Adapter," Craddock et al.; U.S. Ser. No. 12/821,175, filed Jun. 23, 2010, entitled "Converting A Message Signaled Interruption Into An I/O Adapter Event Notification," Craddock et al.; U.S. Ser. No. 12/821,177, filed Jun. 23, 2010, entitled "Converting A Message Signaled Interruption Into An I/O Adapter Event Notification To A Guest Operating System," Brice et al.; U.S. Ser. No. 12/821,178, filed Jun. 23, 2010, entitled "Identification Of Types Of Sources Of Adapter Interruptions," Craddock et al.; U.S. Ser. No. 12/821,179, filed Jun. 23, 2010, entitled "Controlling A Rate At Which Adapter Interruption Requests Are Processed," Belmar et al.; U.S. Ser. No. 12/821,181, filed Jun. 23, 2010, entitled "Controlling The Selectively Setting Of Operational Parameters For An Adapter," Craddock et al.; U.S. Ser. No. 12/821,182, filed Jun. 23, 2010, entitled "Load Instruction for Communicating with Adapters," Craddock et al.; U.S. Ser. No. 12/821,184, filed Jun. 23, 2010, entitled "Controlling Access By A Configuration To An Adapter Function," Craddock et al.; U.S. Ser. No. 12/821,185, filed Jun. 23, 2010, entitled "Discovery By Operating System Of Information Relating To Adapter Functions Accessible To The Operating System," Coneski et al.; U.S. Ser. No. 12/821,187, filed Jun. 23, 2010, entitled "Enable/Disable Adapters Of A Computing Environment," Coneski et al.; U.S. Ser. No. 12/821,190, filed Jun. 23, 2010, entitled "Guest Access To Address Spaces Of Adapter," Craddock et al.; U.S. Ser. No. 12/821,192, filed Jun. 23, 2010, entitled "Operating System Notification Of Actions To Be Taken Responsive To Adapter Events," Craddock et al.; U.S. Ser. No. 12/821,193, filed Jun. 23, 2010, entitled "Measurement Facility For Adapter Functions," Brice et al.; U.S. Ser. No. 12/821,194, filed Jun. 23, 2010, entitled "Store/Store Block Instructions for Communicating with Adapters," Craddock et al.; U.S. Ser. No. 12/821,224, filed Jun. 21, 2010, entitled "Associating Input/Output Device Requests With Memory Associated With A Logical Partition," Craddock et al.; U.S. Ser. No. 12/821,247, filed Jun. 23, 2010, entitled "Scalable I/O Adapter Function Level Error Detection, Isolation, And Reporting," Craddock et al.; U.S. Ser. No. 12/821, 256, filed Jun. 23, 2010, entitled "Switch Failover Control In A Multiprocessor Computer System," Bayer et al.; U.S. Ser. No. 12/821,242, filed Jun. 23, 2010, entitled "A System And Method For Downbound I/O Expansion Request And Response Processing In A PCIe Architecture," Gregg et al.; U.S. Ser. No. 12/821,243, filed Jun. 23, 2010, entitled "Upbound Input/Output Expansion Request And Response Processing In A PCIe Architecture," Gregg et al.; U.S. Ser. No. 12/821,245, filed Jun. 23, 2010, entitled "A System And Method For Routing I/O Expansion Requests And Responses In A PCIe Architecture," Lais et al.; U.S. Ser. No. 12/821,239, filed Jun. 23, 2010, entitled "Input/Output (I/O) Expansion Response Processing In A Peripheral Component Interconnect Express (PCIe) Environment," Gregg et al.; U.S. Ser. No. 12/821,271, filed Jun. 23, 2010, entitled "Memory Error Isolation And Recovery In A Multiprocessor Computer System," Check et al.; and U.S. Ser. No. 12/821,248, filed Jun. 23, 2010, entitled "Connected Input/Output Hub Management," Bayer et al., each of which is hereby incorporated herein by reference in its entirety.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
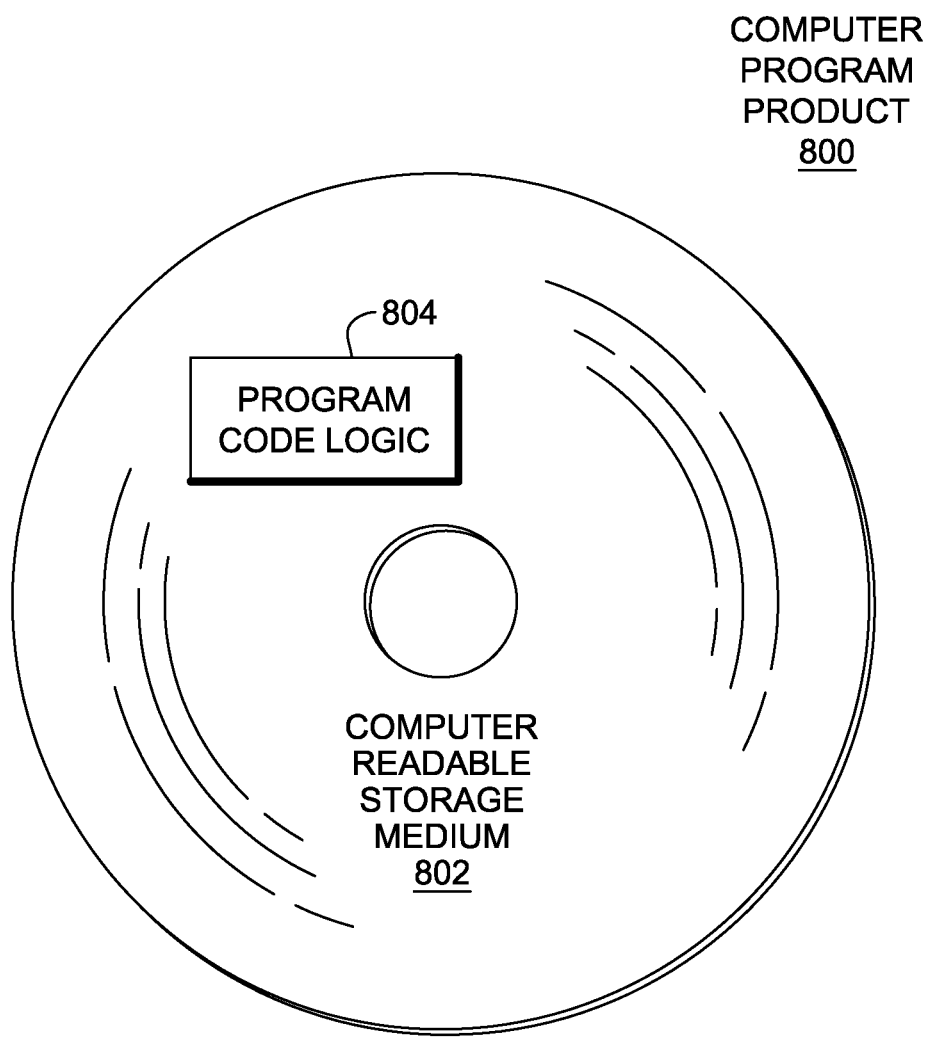
FIG. 8 depicts one embodiment of a computer program product incorporating one or more aspects of the present invention.

Referring now to FIG. 8, in one example, a computer program product 800 includes, for instance, one or more computer readable storage media 802 to store computer readable program code means or logic 804 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. As examples, servers other than System z® servers, such as Power Systems servers or other servers offered by International Business Machines Corporation, or servers of other companies can include, use and/or benefit from one or more aspects of the present invention. Further, although in the example herein, the adapters and I/O hub (e.g., PCI hub) are considered a part of the server, in other embodiments, they do not have to necessarily be considered a part of the server, but can simply be considered as being coupled to system memory and/or other components of a computing environment. The computing environment need not be a server. Further, although the adapters are PCI based, one or more aspects of the present invention are usable with other adapters or other I/O components. Adapter and PCI adapter are just examples. Further, the SCCB may include more, less or different information. In some embodiments, it includes data, which depends on the action qualifier. Many other variations are possible.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 9:
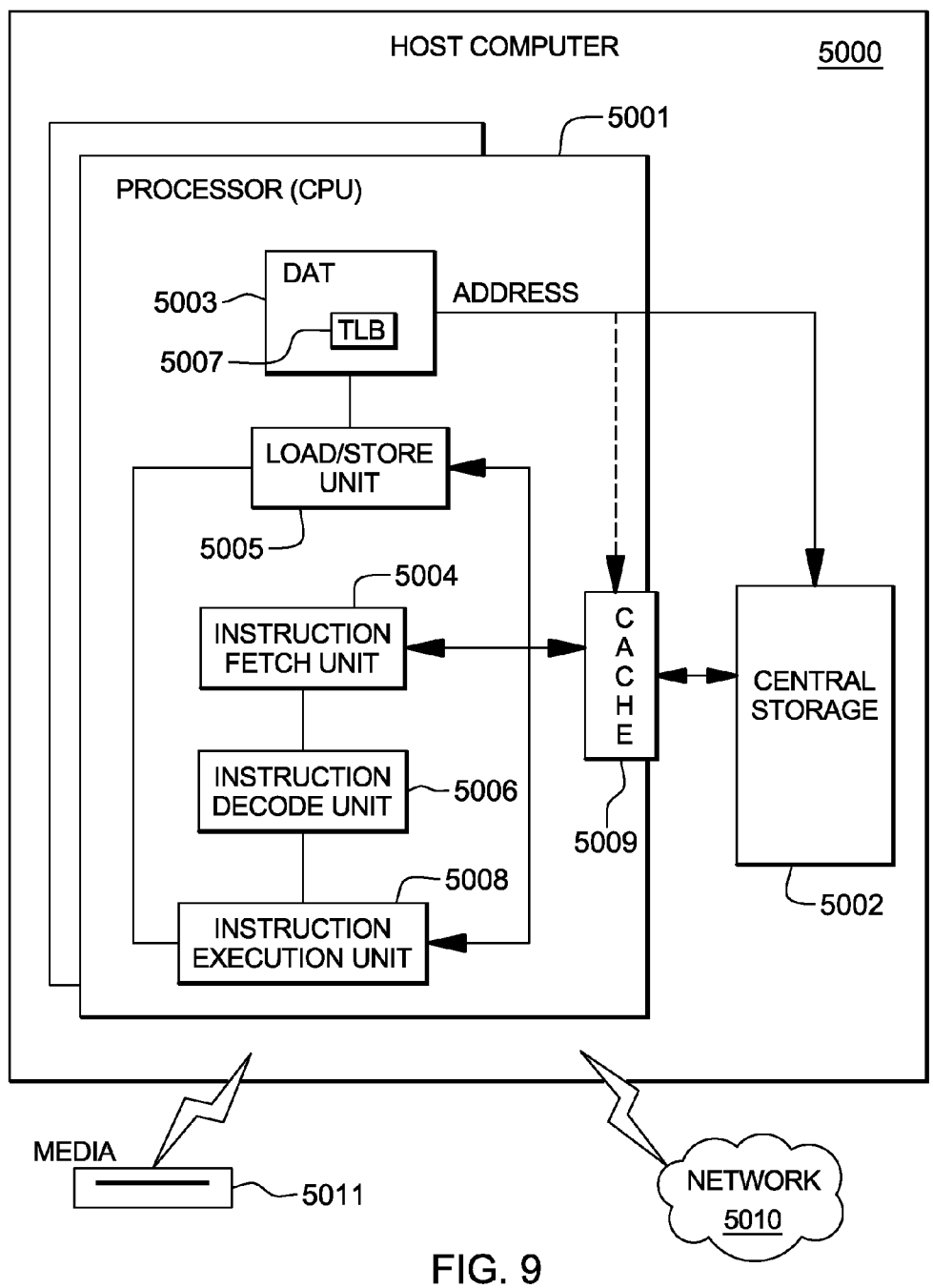
FIG. 9 depicts one embodiment of a host computer system to incorporate and use one or more aspects of the present invention.

Referring to FIG. 9, representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with the present invention). Referring to FIG. 9, software program code which embodies the present invention is typically accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 10:
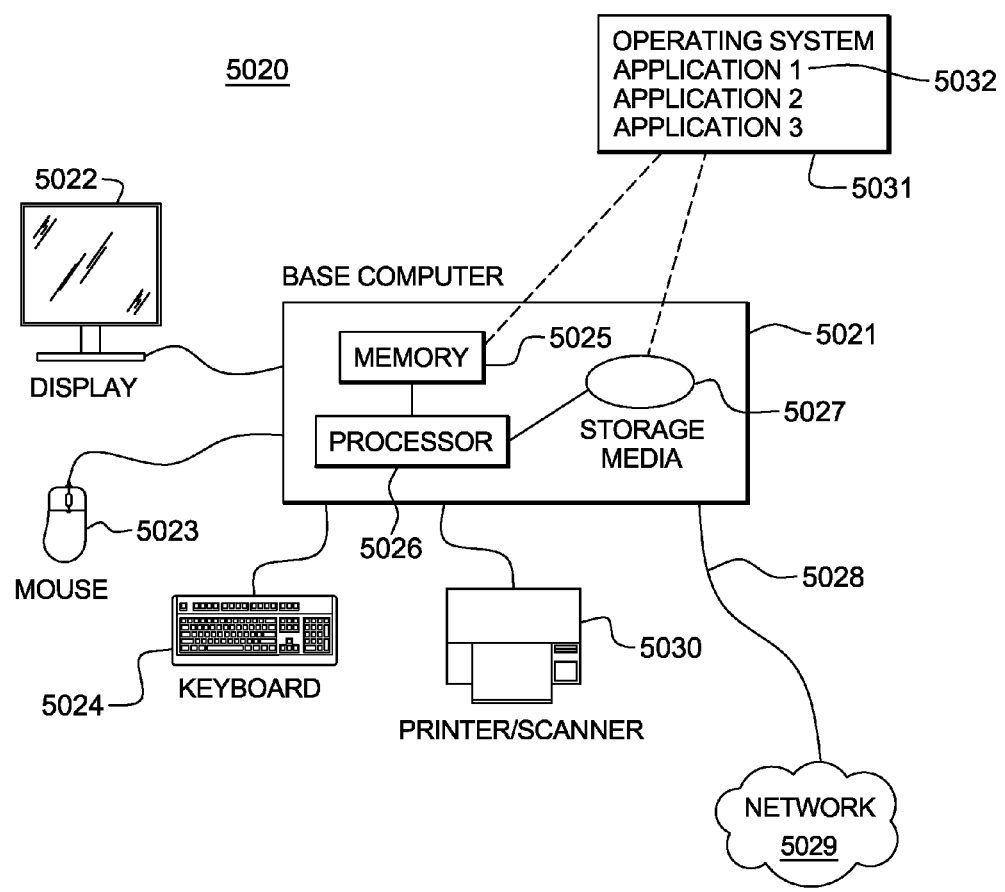
FIG. 10 depicts a further example of a computer system to incorporate and use one or more aspects of the present invention.

FIG. 10 illustrates a representative workstation or server hardware system in which the present invention may be practiced. The system 5020 of FIG. 10 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 11:
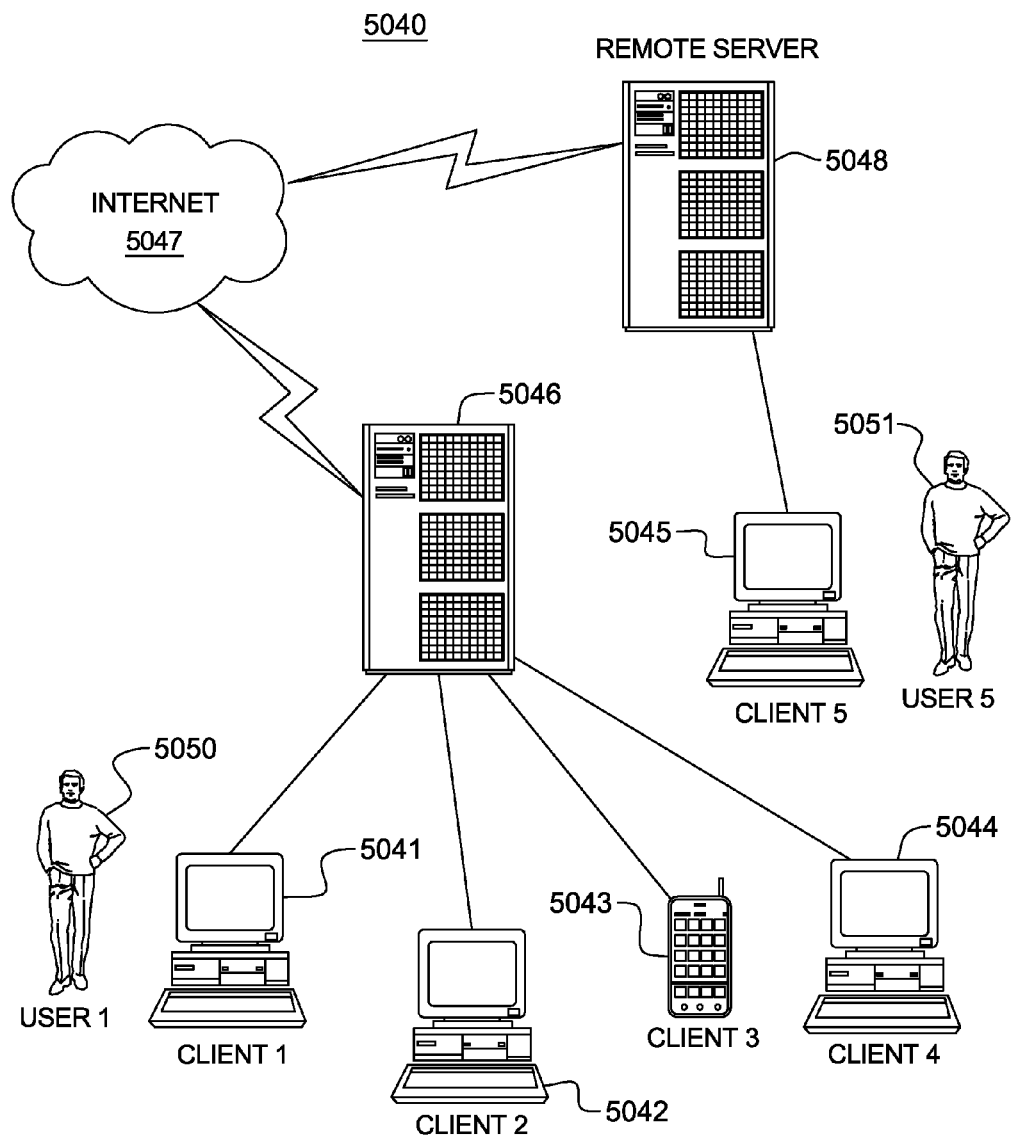
FIG. 11 depicts another example of a computer system comprising a computer network to incorporate and use one or more aspects of the present invention.

FIG. 11 illustrates a data processing network 5040 in which the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 11, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z® server available from International Business Machines Corporation.

Referring concurrently to FIG. 10 and FIG. 11, software programming code which may embody the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 12:
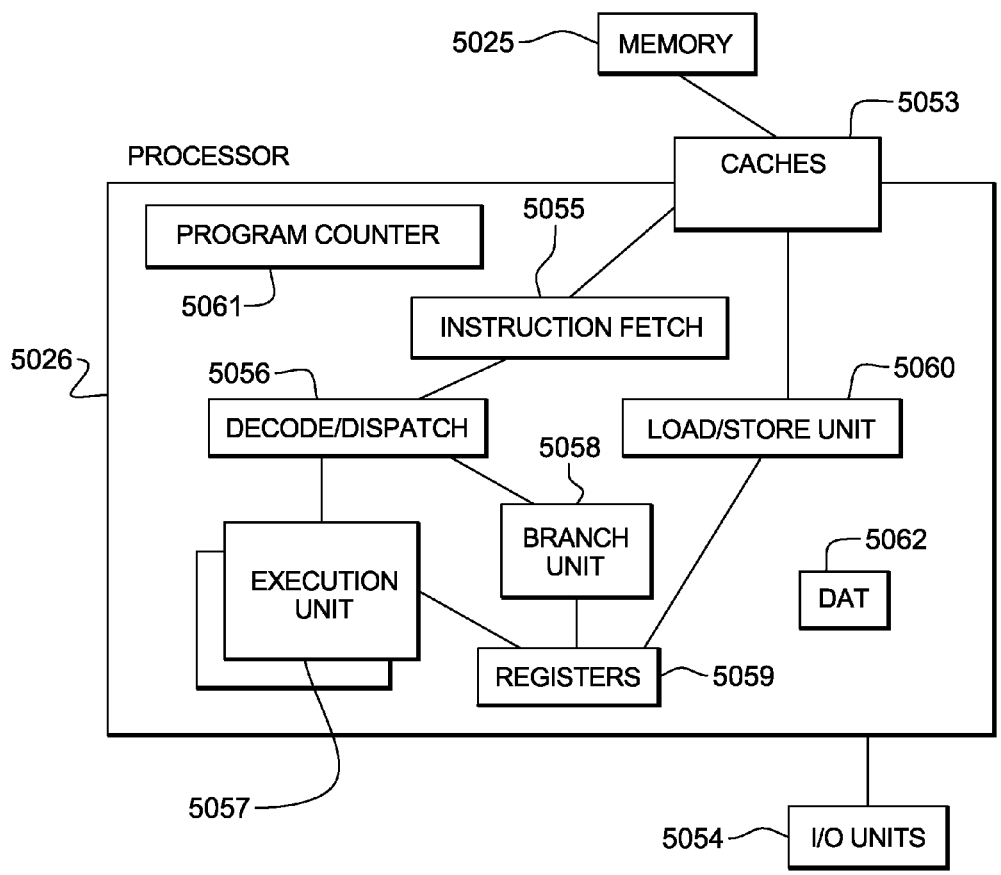
FIG. 12 depicts one embodiment of various elements of a computer system to incorporate and use one or more aspects of the present invention.

Referring to FIG. 12, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 13A:
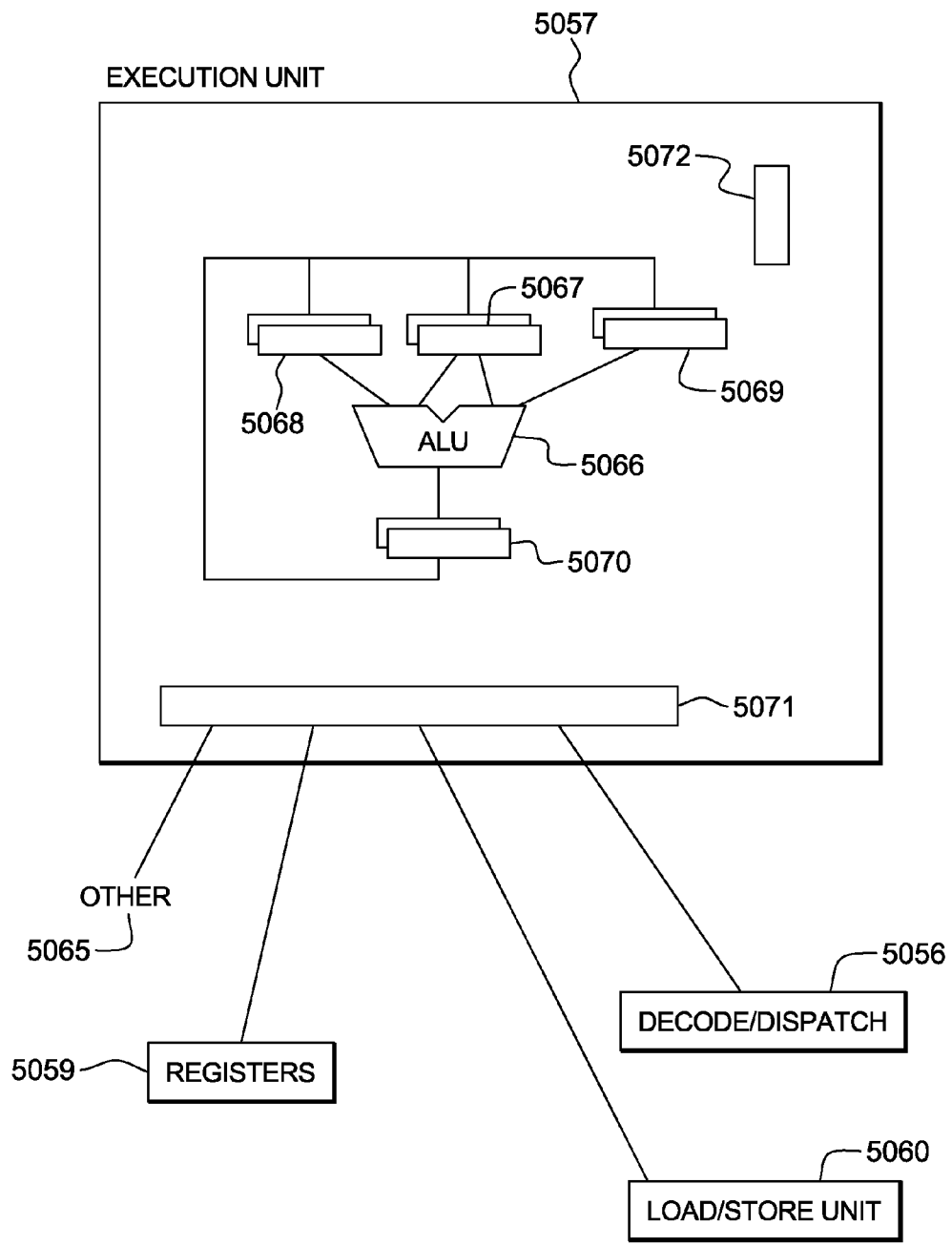
FIG. 13A depicts one embodiment of the execution unit of the computer system of FIG. 12 to incorporate and use one or more aspects of the present invention.

A processor 5026 typically has one or more units 5057, 5058, 5060 for executing the function of the instruction. Referring to FIG. 13A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 13B:
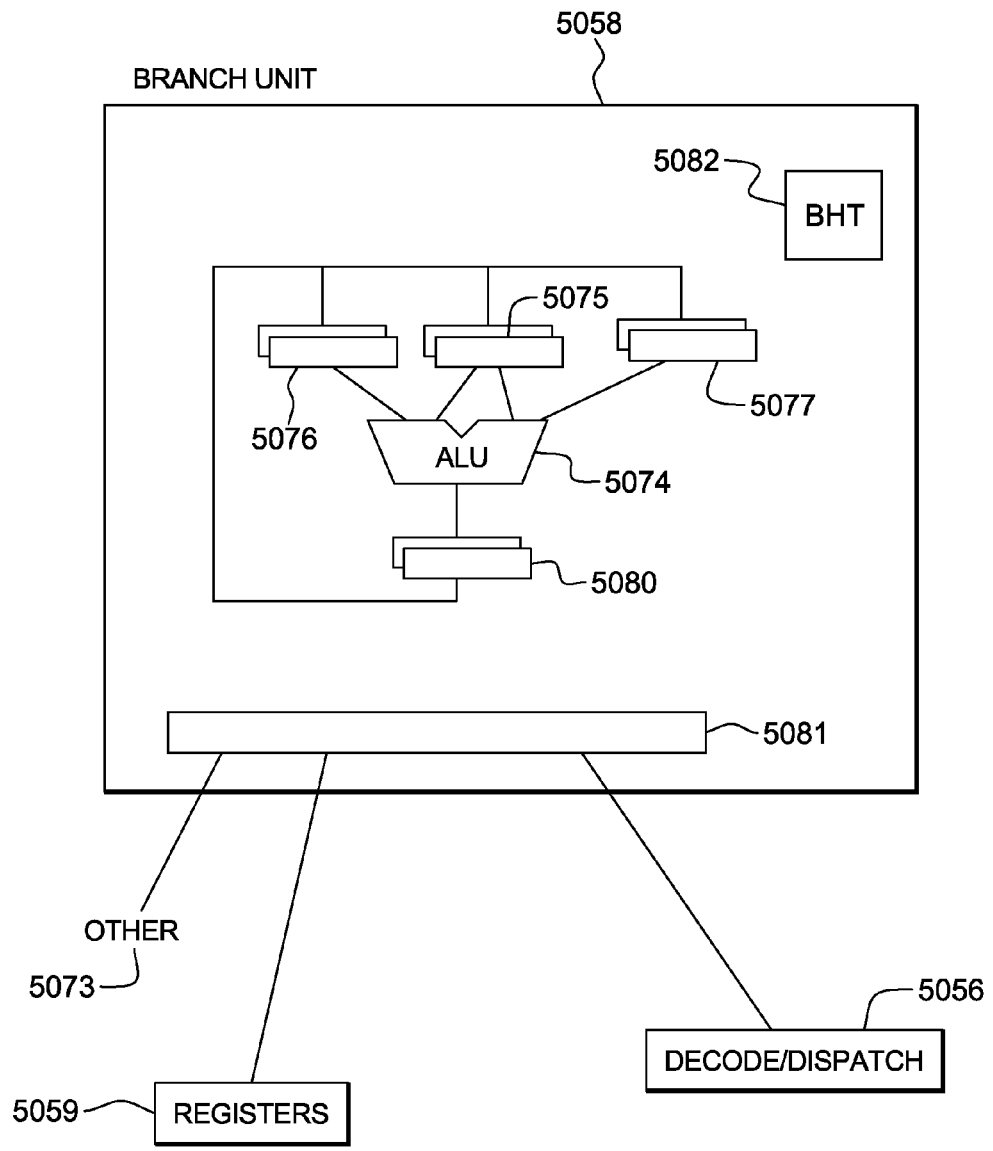
FIG. 13B depicts one embodiment of the branch unit of the computer system of FIG. 12 to incorporate and use one or more aspects of the present invention.

Referring to FIG. 13B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 13C:
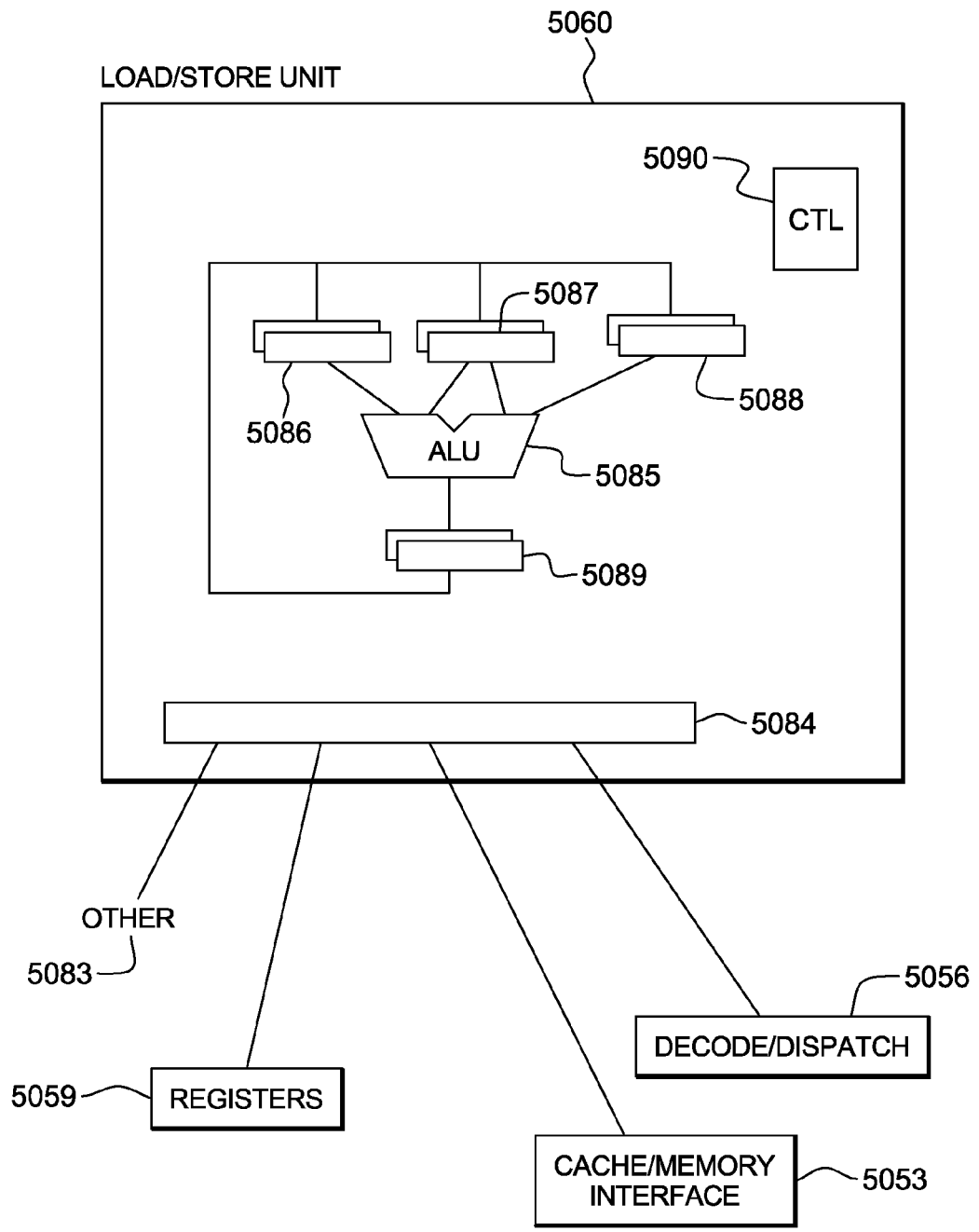
FIG. 13C depicts one embodiment of the load/store unit of the computer system of FIG. 12 to incorporate and use one or more aspects of the present invention.

Referring to FIG. 13C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multiprocessor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 12) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture®, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 14:
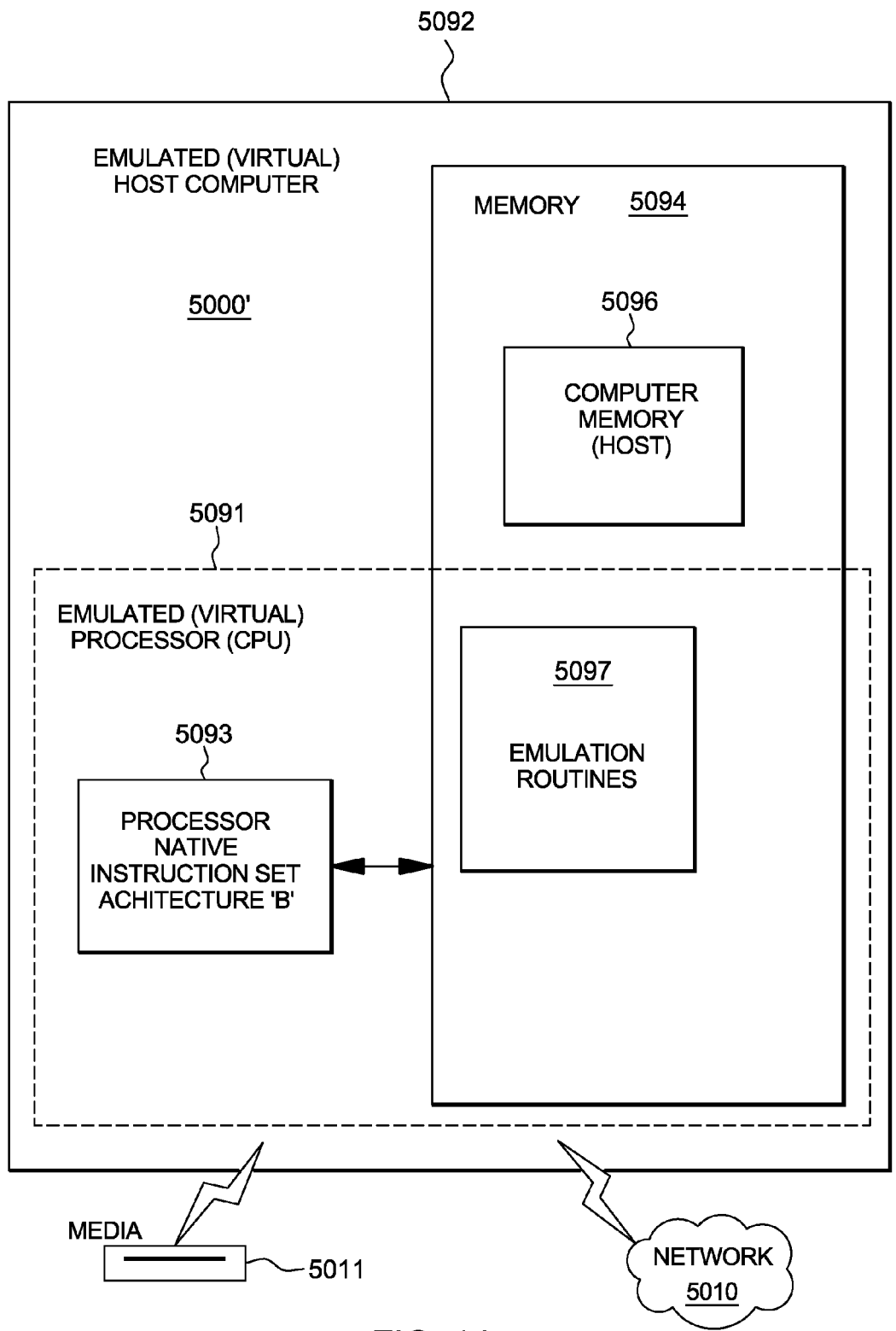
FIG. 14 depicts one embodiment of an emulated host computer system to incorporate and use one or more aspects of the present invention.

In FIG. 14, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for managing events of a computing environment, said computer program product comprising:
a non-transitory computer readable storage medium readable by a processing circuit and storing instructions for execution by the processing circuit for performing a method comprising:
performing processing, based on detecting an event associated with an adapter, the performing processing comprising:
blocking instructions from accessing the adapter, the blocking comprising setting one or more indicators in a function table entry located in a system memory and associated with the adapter, the function table entry located using a function handle associated with the adapter, the function handle comprising at least one of a function number identifying the adapter, an enable indicator indicating whether the function handle is enabled, and an instance number specifying a particular instance of the function handle;
determining from a plurality of possible error types a type of error of the event being detected;
creating a PCI event based on the determined type of error of the event, the PCI event comprising one or more error details depending on the determined type of error;
initiating notification of an operating system of the created PCI event; and
executing a Store Event Information command issued by the operating system to obtain information from the created PCI event, the information comprising the function handle identifying the adapter, error details depending on the determined type of error, and a PCI event code describing a reason for notification of the event.

2. The computer program product of claim 1, wherein the event is associated with a plurality of adapters, each adapter having a separate error log.

3. The computer program product of claim 1, wherein the initiating notification comprises employing a channel report word (CRW).

4. The computer program product of claim 1, wherein the method further comprises blocking accesses from the adapter, the blocking comprises setting one or more indicators in a device table entry associated with the adapter.

5. The computer program product of claim 1, wherein the method further comprises:
   setting an error vector indicator in an error vector to indicate an error; and
   providing an attention interrupt to a processing unit executing the operating system.

6. The computer program product of claim 5, wherein the method further comprises:
   determining whether data regarding the error is to be logged; and
   logging the data, based on the determining indicating data is to be logged.

7. The computer program product of claim 5, wherein the method further comprises based on the attention interrupt, setting, by the processing unit, the one or more indicators in the function table entry associated with the adapter to block access to the adapter.

8. The computer program product of claim 7, wherein the method further comprises:
   determining whether recovery is to be performed by a component of the computing environment other than the operating system; and
   performing recovery, based on the determining indicating recovery is to be performed.

9. The computer program product of claim 8, wherein the method further comprises:
   generating an error event, based on at least attempting to perform recovery;
   presenting the error event to a hypervisor managing the operating system;
   determining based on the error event whether recovery was successful; and
   re-enabling one or more operations of the adapter, based on determining recovery was successful.

10. The computer program product of claim 1, wherein the method further comprises:
    determining, based on detecting the event, that the event is not of the adapter;
    determining, based on the event not being of the adapter, a hardware component providing the event; and
    identifying, based on the hardware component, the adapter to be placed in an error state.

11. The computer program product of claim 10, wherein the method further comprises:
    identifying, based on the hardware component, a plurality of adapters to be placed in the error state; and
    placing the plurality of adapters in the error state.

12. The computer program product of claim 1, wherein the plurality of possible error types includes a direct memory access error, an interrupt error, and a bus error.

13. The computer program product of claim 1, wherein the determining the type of error comprises decoding an error type included in an error log entry located using a value associated with a device table entry located in an I/O hub coupled to the adapter, the device table entry corresponding to the adapter and including an error indicator indicating whether memory accesses are to be blocked.

14. A computer system for managing events of a computing environment, said computer system comprising:
    a memory; and
    a processor in communications with the memory, wherein the computer system is configured to perform a method, said method comprising:
      performing processing, based on detecting an event associated with an adapter, the performing processing comprising:
        blocking instructions from accessing the adapter, the blocking comprising setting one or more indicators in a function table entry located in a system memory and associated with the adapter, the function table entry located using a function handle associated with the adapter, the function handle comprising at least one of a function number identifying the adapter, an enable indicator indicating whether the function handle is enabled, and an instance number specifying a particular instance of the function handle;
        determining from a plurality of possible error types a type of error of the event being detected;
        creating a PCI event based on the determined type of error of the event, the PCI event comprising one or more error details depending on the determined type of error;
        initiating notification of an operating system of the created PCI event; and
        executing a Store Event Information command issued by the operating system to obtain information from the created PCI event, the information comprising the function handle identifying the adapter, error details depending on the determined type of error, and a PCI event code describing a reason for notification of the event.

15. The computer system of claim 14, wherein the event is associated with a plurality of adapters, each adapter having a separate error log.

16. The computer system of claim 14, wherein the initiating notification comprises employing a channel report word (CRW).

17. The computer system of claim 14, wherein the method further comprises:
    setting an error vector indicator in an error vector to indicate an error;
    providing an attention interrupt to a processing unit executing the operating system; and
    based on the attention interrupt, setting, by the processing unit, the one or more indicators in the function table entry associated with the adapter to block access to the adapter.

18. The computer system of claim 14, wherein the method further comprises:
    determining whether recovery is to be performed by a component of the computing environment other than the operating system; and
    performing recovery, based on to the determining indicating recovery is to be performed.

19. The computer system of claim 18, wherein the method further comprises:
    generating an error event, based on at least attempting to perform recovery;
    presenting the error event to a hypervisor managing the operating system;

determining based on the error event whether recovery was successful; and re-enabling one or more operations of the adapter, based on determining recovery was successful.

20. The computer system of claim 14, wherein the method further comprises:

determining, based on detecting the event, that the event is not of the adapter;

determining, based on the event not being of the adapter, a hardware component providing the event; and identifying, based on the hardware component, the adapter to be placed in an error state.

21. A method for managing events of a computing environment, said method comprising:

performing processing by a processing unit, based on detecting an event associated with an adapter, the performing processing comprises:

blocking instructions from accessing the adapter, the blocking comprising setting one or more indicators in a function table entry located in a system memory and associated with the adapter, the function table entry located using a function handle associated with the adapter, the function handle comprising at least one of a function number identifying the adapter, an enable indicator indicating whether the function handle is enabled, and an instance number specifying a particular instance of the function handle;

determining from a plurality of possible error types a type of error of the event being detected;

creating a PCI event based on the determined type of error of the event, the PCI event comprising one or more error details depending on the determined type of error;

initiating notification of an operating system of the created PCI event; and executing a Store Event Information command issued by the operating system to obtain information from the created PCI event, the information comprising the function handle identifying the adapter, error details depending on the determined type of error, and a PCI event code describing a reason for notification of the event.

22. The method of claim 21, wherein the event is associated with a plurality of adapters, each adapter having a separate error log.

* * * * *